(12) United States Patent
Ueda

(10) Patent No.: US 8,085,328 B2
(45) Date of Patent: Dec. 27, 2011

(54) IMAGE PICKUP APPARATUS

(75) Inventor: Toshiharu Ueda, Machida (JP)

(73) Assignee: Canon Kabushiki Kaisha (JP)

( * ) Notice: Subject to any disclaimer, the term of this patent is extended or adjusted under 35 U.S.C. 154(b) by 592 days.

(21) Appl. No.: 12/251,565

(22) Filed: Oct. 15, 2008

(65) Prior Publication Data

US 2009/0096905 A1    Apr. 16, 2009

(30) Foreign Application Priority Data

Oct. 15, 2007    (JP) ................. 2007-268008

(51) Int. Cl.
*H04N 5/335* (2006.01)
*H04N 5/217* (2006.01)

(52) U.S. Cl. .............. 348/308; 348/301; 348/241

(58) Field of Classification Search .......... 348/345, 348/308, 335, 374, 301, 241; 257/223
See application file for complete search history.

(56) References Cited

U.S. PATENT DOCUMENTS

| | | | |
|---|---|---|---|
| 6,963,371 B2 | 11/2005 | Sakurai et al. | |
| 7,787,038 B2 * | 8/2010 | Mabuchi | 348/302 |
| 7,868,943 B2 * | 1/2011 | Yamamoto | 348/345 |
| 7,916,199 B2 * | 3/2011 | Kagawa et al. | 348/308 |
| 7,929,043 B2 * | 4/2011 | Tsubaki et al. | 348/348 |
| 2005/0195307 A1 | 9/2005 | Sakurai et al. | |

FOREIGN PATENT DOCUMENTS

| | | |
|---|---|---|
| JP | 2001-230974 A | 8/2001 |
| JP | 2001-268453 A | 9/2001 |
| JP | 2005-323108 A | 11/2005 |

* cited by examiner

*Primary Examiner* — Mohammed Hasan
(74) *Attorney, Agent, or Firm* — Rossi, Kimms & McDowell LLP

(57) ABSTRACT

An image pickup apparatus which is capable of providing optimal image quality according to a scene to be shot, and is improved in user-friendliness. A determination unit comprising a comparator, a comparison potential, and an OR element determines an output level of each pixel or each area formed by a plurality of pixels in the image pickup device with reference to a predetermined output level. A system controller changes a charge transfer period in a horizontal blanking period for a line including a pixel or an area of with the output level is not lower than the predetermined output level, according to a result of determination by the determination unit.

22 Claims, 18 Drawing Sheets

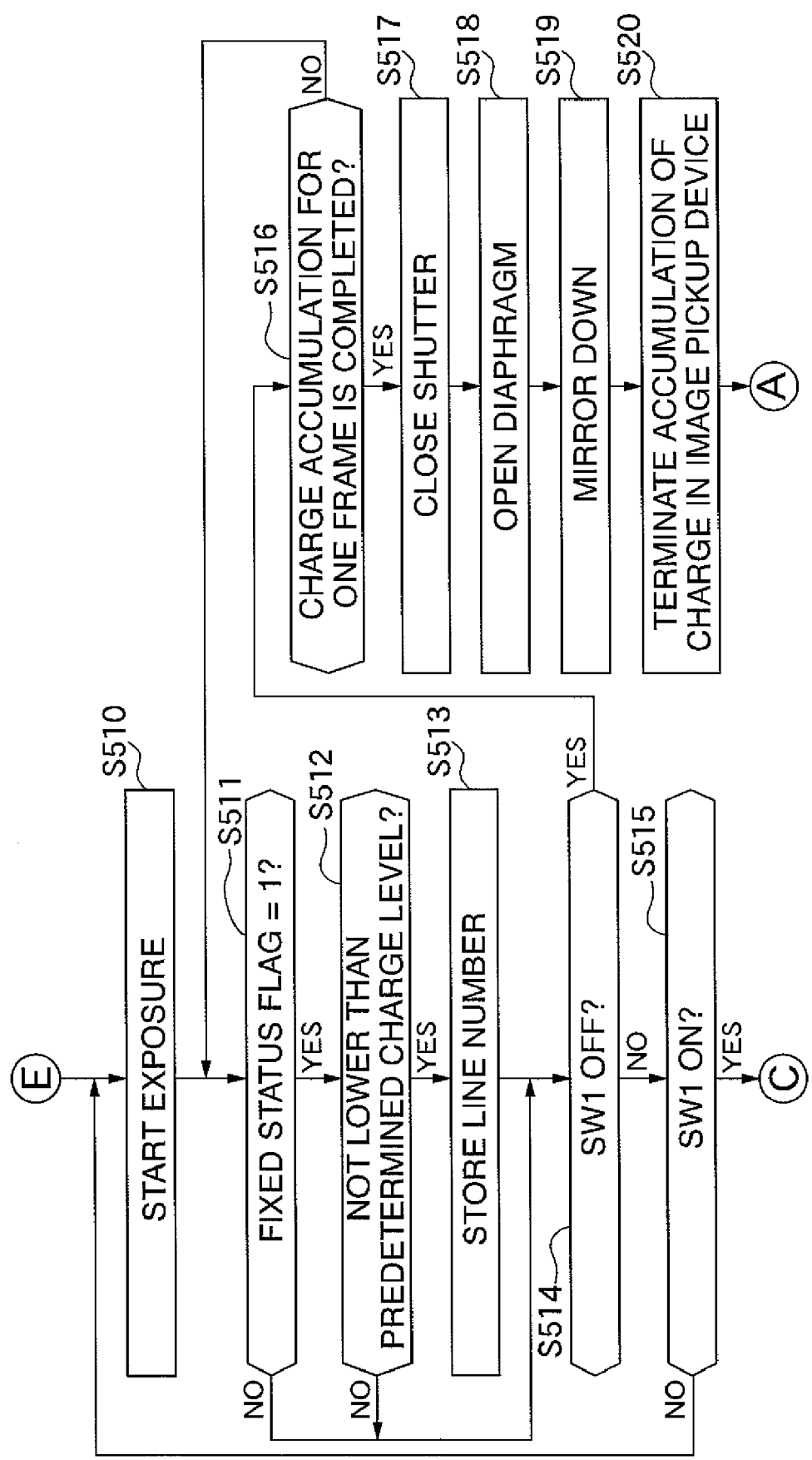

IMAGE PICKUP APPARATUS

BACKGROUND OF THE INVENTION

1. Field of the Invention

The present invention relates to an image pickup apparatus using an image pickup device, such as a CCD or CMOS image sensor, and more particularly to an image pickup apparatus characterized by a technique which makes it possible to improve both the feeling of use of the image pickup apparatus and the image quality of a picked-up image.

2. Description of the Related Art

Recently, image pickup apparatuses, such as digital cameras and video cameras, using an image pickup device like a CCD/CMOS image sensor (CMOS area sensor) have come into widespread use.

Some image pickup apparatuses are capable of operating in a plurality of shooting modes, and many of the shooting modes involve changes in shooting speed and continuous shooting speed. For example, a single-shot mode in which a single-shot operation is performed by pressing a shutter switch only once, and a continuous shooting mode in which a shooting operation is continuously repeated until the shutter switch is released (see e.g. the "abstract" of Japanese Patent Laid-Open Publication No. 2001-268453).

As for the continuous shooting mode, much importance is placed on the continuous shooting speed for the purpose of sports shooting and the like.

By the way, it is generally known that an image pickup operation by an image pickup apparatus, such as a digital camera or a video camera, using an image pickup device is executed by a sequence of operations of charge accumulation in the image pickup device—charge transfer to a downstream part and signal reading therefrom.

The image pickup operation will be described with reference to FIGS. 14 and 15.

FIG. 14 is a circuit diagram of the general configuration of a pixel section of a CMOS area sensor.

As shown in FIG. 14, in each pixel, there are arranged a photodiode (PD) 14-1, a transfer switch (TX) 14-2, a reset switch (TRES) 14-3, a source follower (SF) 14-10 as a pixel amplifier, and a line selection switch (TSEL) 14-6.

The transfer switch (TX) 14-2 has a gate thereof connected to a control line FTX (n, n+1) from a vertical scanning circuit 14-14, and the reset switch (TRES) 14-3 has a gate thereof connected to a control line FRES (n, n+1) from the vertical scanning circuit 14-14. Further, the line selection switch (TSEL) 14-6 has a gate thereof connected to a control line FSEL (n, n+1) from the vertical scanning circuit 14-14.

Further, a gate 14-11 (floating diffusion (FD) gate; hereinafter also referred to as "FD") of the source follower (SF) 14-10 is connected to the transfer switch 14-2, the reset switch 14-3, and a capacitor 14-9.

Photoelectric conversion is performed by the photodiode 14-1, and the transfer switch 14-2 is held off during photoelectric charge accumulation. This prevents electric charge obtained through photoelectric conversion by the photodiode 14-1 from being transferred to the gate 14-11 of the source follower 14-10 which forms a pixel amplifier.

However, when an object is a high luminance object, the amount of electric charge accumulated in the photodiode 14-1 can exceed the saturation level of the transfer switch 14-2, causing leakage of electric charge into the gate 14-11 of the source follower 14-10.

When a comparator detects that the potential of charge leaked to the gate 14-11 of the source follower 14-10 has reached a predetermined level, the output of the comparator turns on. Then, a signal is transmitted to the input of an OR element, and the OR element transmits to a memory controller the signal as one indicating an area (line) where charge leakage has occurred.

The gate 14-11 of the source follower 14-10 forming the pixel amplifier basically has its voltage initialized to an appropriate level by turn-on of the reset switch 14-3 before starting of charge accumulation. This voltage level provides a dark level.

When the line selection switch 14-6 is turned on subsequently or simultaneously, a source follower section formed by a load current source 14-7 and the pixel amplifier (source follower 14-10) are brought into an operating state. When the transfer switch 14-2 is turned on at this time, electric charge accumulated in the photodiode 14-1 is transferred to the gate 14-11 of the source follower 14-10 as the pixel amplifier. Reference numeral 14-4 denotes a reset power supply, and 14-5 a power supply for driving the source follower 14-10.

At this time, outputs from a selected line are generated on a vertical output line. The outputs are each accumulated in a signal accumulator 14-15 via a transfer gate 14-15$a$ or 14-15$b$. The outputs temporarily stored in the signal accumulator 14-15 are sequentially read out into an output amplifier section by a horizontal scanning circuit 14-16.

FIG. 15 is a timing diagram useful in explaining general operational timing in the CMOS area sensor shown in FIG. 14.

First, reset of the pixel section is started at time T0. At time T0, the control lines FTX(n), FTX(n+1), FRES(n), and FRES(n+1) are asserted. In this state, electric charge in the cathode of the photodiode 14-1 has moved to the gate 14-11 of the source follower 14-10, and is averaged. By increasing the capacitive component of the capacitor 14-9 of the gate (FD gate) 14-11 of the source follower 14-10, the potential of the averaged electric charge becomes substantially equal to the level as obtained when the cathode of the photodiode 14-1 is reset.

Then, at time T1, the control lines FTX(n), FTX(n+1), FRES(n), and FRES(n+1) are negated. In this timing, charge accumulation is started. However, a mechanical shutter, not shown, remains closed.

Then, at time T2, the mechanical shutter, not shown, for guiding light from an object image opens to start an actual exposure operation. The mechanical shutter is closed at time T3. In other words, a time period T2 to T3 corresponds to an exposure period (charge accumulation period) in the image pickup apparatus.

It should be noted that when leakage of electric charge into the gate 14-11 of the source follower 14-10 occurs during an exposure period (charge accumulation period) due to an exposure to a high-luminance object and the potential of the accumulated electric charge exceeds the predetermined level, a determination unit (the comparator, a comparison potential, and the OR element) performs information transmission to the memory controller. This causes information on a line where charge leakage has occurred, i.e. information on a saturated line to be stored.

After time T4, line-by-line transfer operations are started. More specifically, reading operations for an n-th line, an (n+1)-th line, and so forth are sequentially performed.

At time T4, the control line FSEL(n) is asserted to turn on the line selection switch 14-6, whereby each of the source followers 14-10 of all pixels arranged in the n-th line is brought into an operating state. At the same time, the control line FTN(n) is asserted to keep the transfer gate 14-15$b$ on until time T7.

In this timing, the transfer gate 14-15b starts charge transfer to the signal accumulator 14-15. Then, at time T5, the control line FRES(n) is asserted, to turn on the reset switch 14-3, whereby electric charge in the gate 14-11 of the source follower 14-10 is initialized, i.e. set to the dark level.

The reset switch 14-3 is turned off at time T6, and stabilization of the electric charge in the gate 14-11 of the source follower 14-10 at the dark level is awaited during a time period Tn from T6 to T7.

Next, the control line FTN(n) is negated at time T7. This timing corresponds to a time at which the transfer of the electric charge at the dark level to the signal accumulator 14-15 is terminated. This operation is carried out simultaneously in parallel for all the pixels arranged in the n-th line.

A time period T4 to T7 (including the stabilization-awaiting time period Tn) over which a signal output at the dark level is transferred to the signal accumulator 14-15, awaited to be stable, and held is referred to as the "N reading" period.

After the dark-level charge transfer to the signal accumulator 14-15 (N reading) is terminated (T7), at time TB, the control line FTS is asserted only during a time period T8 to T11 to keep the transfer gate 14-15b on until T11. In this timing, the transfer gate 14-15b starts to transfer electric charge to the signal accumulator 14-15.

Then, at time T9, the control line FTX(n) is asserted to turn on the transfer switch 14-2, whereby signal charge accumulated in the photodiode 14-1 is transferred to the gate 14-11 of the source follower 14-10.

At this time, the potential of the gate 14-11 of the source follower 14-10 changes from the initialized level (dark level) by an amount corresponding to the received signal charge to thereby finally define the signal level.

The transfer switch 14-2 is turned off at time T10, but stabilization of the electric charge in the gate 14-11 of the source follower 14-10 is awaited during a time period Ts from T10 to T11.

Next, the control line FTS (n) is negated at time T11. This timing corresponds to a time at which the transfer of the electric charge at the signal output level to the signal accumulator 14-15 is terminated. This operation is carried out simultaneously in parallel for all the pixels arranged in the n-th line.

A time period T8 to T11 (including the stabilization-awaiting time period Ts) over which a signal output at the output signal level is transferred to the signal accumulator 14-15, awaited to be stable, and held is referred to as the "S reading" period. The total time period of the "N reading" period and the "S reading" period is referred to as "the charge transfer period".

At a time point (T11) when the operation in the charge transfer period is terminated, the signal accumulator 14-15 stores the dark level and the signal level of each of all the pixels arranged in the n-th line, and the difference between the dark level and the signal level of each pixel is obtained.

This cancels fixed pattern noise (FPN) caused by variation in a threshold voltage Vth between the source followers and KTC noise made by the reset switch 14-3 at a reset time, whereby it is possible to obtain signals having a high S/N ratio with noise components removed therefrom.

The horizontal scanning circuit 14-16 horizontally scans dark-level and signal-level difference signals accumulated in the signal accumulator 14-15 and outputs them in a time-series manner at a time period from time T11 to time T12. This completes output from the n-th line.

Similarly, the control lines FSEL(n+1), FRES(n+1), FTX(n+1), FTN, and FTS are driven as shown in FIG. 15, whereby signals in the (n+1)-th line can be read out as from the n-th line.

As described above, in a shooting process executed by the image pickup apparatus using the CMOS area sensor, in order to convert an electric charge generated in the photodiode into a signal voltage and read out the signal voltage into the output amplifier, there is provided the aforementioned charge transfer period formed by the "N (noise/dark) reading" period for transferring a noise component to the signal accumulator and the "S (signal) reading" period for transferring a signal component to the signal accumulator.

The charge transfer period includes a time period for awaiting stabilization of a power supply voltage which is changed by switch on/off of the transfer gate or the like. Therefore, when the charge transfer period is too short, charge transfer has to be performed before the power supply voltage is stabilized, which can cause degradation of the image quality of a recorded image.

Particularly in a high-luminance portion, a large amount of electric charge moves, and hence variation in power supply voltage is apt to occur. Therefore, e.g. when a scene with a small high-luminance object in the dark is photographed, if the charge transfer period is short, N reading and S reading are performed in a state where the power supply has not been stabilized yet.

As a result, in a dark-pixel/optical black (OB), there is produced a difference in output voltage level between a line having a high-luminance portion area and a line having no such high-luminance portion, which causes generation of a whitish belt (smear) around the high-luminance portion (see e.g. "Problems to be Solved" in Japanese Patent Laid-Open Publication No. 2001-230974).

Therefore, it is ideal that the charge transfer period is set to a time period including sufficient time for stabilization of the power supply. However, when an image pickup apparatus has a continuous shooting mode (particularly a high-speed continuous shooting mode), repeating time (continuous shot frame speed-dependent time (hereinafter referred to as "recycle time")) is also required. For this reason, it is general that an appropriate charge transfer period is selected and fixedly set in consideration of the allowable range of image quality and the recycle time.

However, if the image transfer period for a whole image (i.e. all lines) is sufficiently extended so as to prevent degradation of image quality in a high-luminance portion of an object, it is inevitably required to increase recycle time. In particular, a digital single-lens reflex camera with the aim of obtaining high image quality and high resolution requires an increased number of pixels, which inevitably causes an increase in the number of lines and extension of the charge transfer period. When the charge transfer period is extended, a time period corresponding to the increased number of lines has an influence on the recycle time, which seriously degrades snapshot performance.

As means for avoiding the above problem, it is proposed to change the charge transfer period according to the brightness of an object (see Japanese Patent Laid-Open Publication No. 2005-323108).

However, in Japanese Patent Laid-Open Publication (Kokai) No. 2005-323108, depending on the result of brightness measurement of an object by an external photometer, if a high-luminance portion is detected, the charge transfer period corresponding to all lines of an image is extended and hence continuous shooting e.g. of an illuminated object is performed with the charge transfer period extended for all lines. Therefore, there remains room for improvement of snapshot performance.

SUMMARY OF THE INVENTION

The present invention provides an image pickup apparatus which is capable of providing optimal image quality according to a scene to be shot, and is improved in user-friendliness.

In a first aspect of the present invention, there is provided an image pickup apparatus which uses a CMOS area sensor as an image pickup device and records a picked-up image in a storage medium, comprising a determination unit adapted to determine an output level of each pixel or each area formed by a plurality of pixels in the image pickup device with reference to a predetermined output level, and a control unit adapted to change a charge transfer period in a horizontal blanking period for a line including a pixel or an area of which the output level is not lower than the predetermined output level, according to a result of determination by the determination unit.

According to the image pickup apparatus of the present invention, it is possible to provide providing optimal image quality according to a scene to be shot, and improve user-friendliness.

The features and advantages of the invention will become more apparent from the following detailed description taken in conjunction with the accompanying drawings.

DETAILED DESCRIPTION OF THE EMBODIMENTS

The present invention will now be described in detail below with reference to the accompanying drawings showing embodiments thereof.

Figure 1:
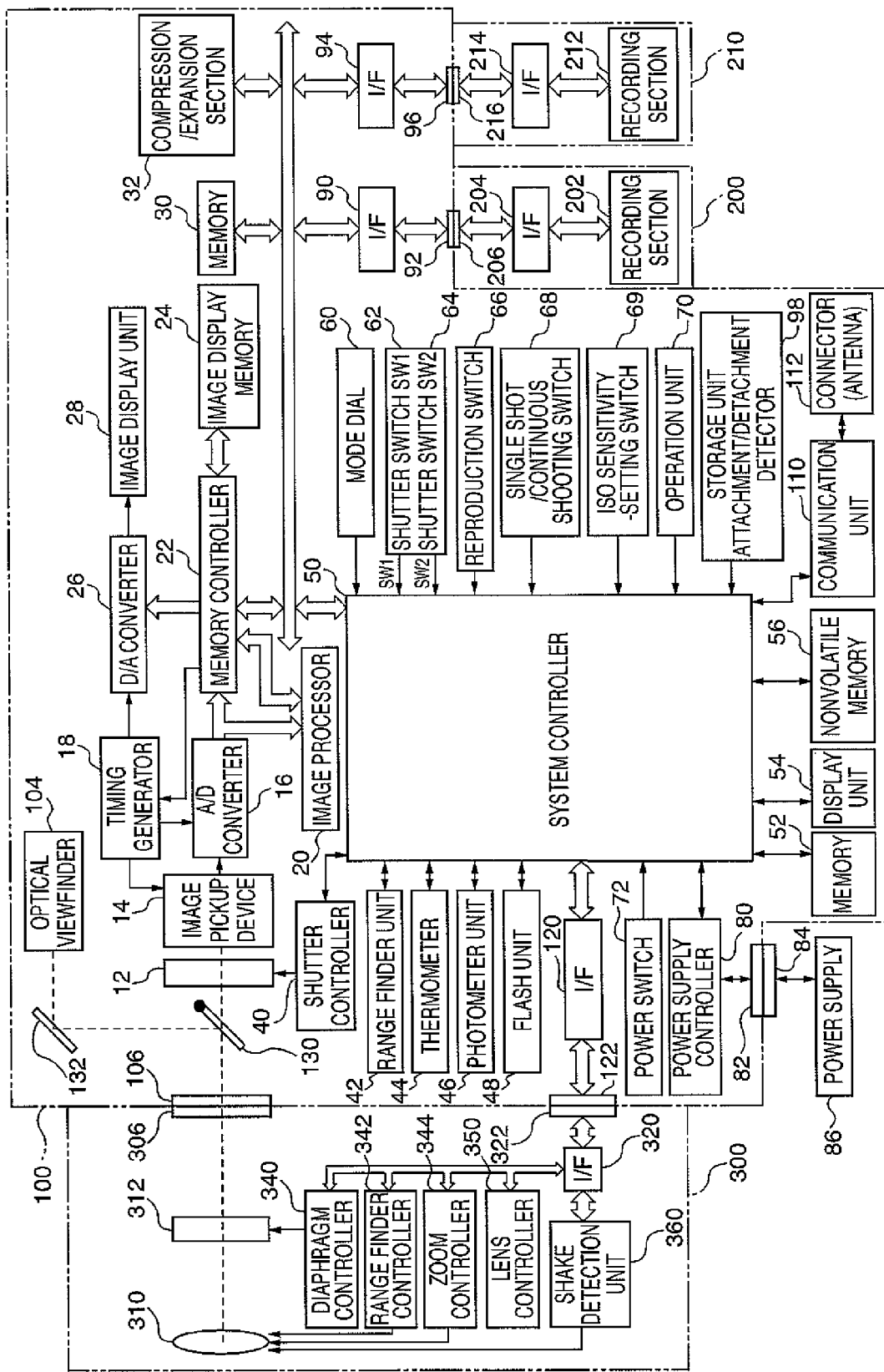
FIG. 1 is a block diagram of an image pickup apparatus according to a first embodiment of the present invention.

FIG. 1 is a block diagram of an image pickup apparatus according to a first embodiment of the present invention.

As shown in FIG. 1, the image pickup apparatus is comprised of an image processing unit 100, storage units 200 and 210, and a lens unit 300. In the following, the arrangement of the image pickup apparatus will be described in detail along with the operation of the same.

A shutter 12 controls exposure of an image pickup device 14 to light. The image pickup device 14 converts an optical image into an electric signal. A ray of light incident through a photographic lens 310 is guided via a diaphragm 312 and the shutter 12 to form an optical image on the image pickup device 14. The image pickup device 14 is implemented by a solid-state image pickup device, such as a CCD.

An A/D converter 16 converts the signal output from the image pickup device 14, which is an analog signal, into a digital signal. A timing generator 18 is configured to supply clock signals and control signals to the image pickup device 14, the A/D converter 16, and a D/A converter 26. The timing generator 18 is controlled by a memory controller 22 and a system controller 50.

An image processor 20 performs predetermined pixel interpolation and color conversion on data output from the A/D converter 16 or the memory controller 22. Further, the image processor 20 carries out predetermined computations using picked-up image data, as required.

Then, the system controller 50 controls a shutter controller 40 for controlling the shutter 12 provided with a stopping-down function, and a range finder unit 42, based on results of the computations. TTL (Through-The-Lens) AF (Auto Focus) processing, AE (Auto Exposure) processing, and EF (electronic flash pre-emission) processing can be performed under the control of the system controller 50.

Further, the image processor 20 carries out predetermined computations using picked-up image data and performs AWB (Auto White Balance) processing based on results of the computations.

It should be noted that in the present embodiment, the image pickup apparatus is provided with the range finder unit 42 and a photometer unit 46 as parts dedicated, and hence carries out the AF processing, the AE processing, and the EF processing using the range finder unit 42 and the photometer unit 46. With this arrangement, the AF processing and the AE processing are performed without using the image processor 20.

However, a configuration may be employed in which the AF processing and the AE processing are performed using the image processor 20.

The memory controller 22 controls the A/D converter 16, the timing generator 18, the image processor 20, an image display memory 24, the D/A converter 26, a memory 30, and a compression/expansion section 32.

Data output from the A/D converter 16 is written into the image display memory 24 or the memory 30 via the image processor 20 and the memory controller 22, or directly via the memory controller 22.

An image display unit 28 includes a TFT LCD or the like. Image data written into the image display memory 24 for display is displayed on the image display unit 28 via the D/A converter 26. An electronic finder function can be realized by sequentially displaying picked-up image data on the image display unit 28.

Further, the image display unit 28 is capable of having its display arbitrarily turned on/off in response to an instruction from the system controller 50. If the display is turned off, the power consumption of the image processing unit 100 can be considerably reduced.

The memory 30 is used for storing picked-up still and moving images, and has a sufficiently large storage capacity for storing a predetermined number of still images and moving images recorded for a predetermined time period. This enables high-speed writing of a large amount of image data into the memory 30 even in continuous shooting in which a plurality of still images are consecutively photographed or in panorama shooting. Further, the memory 30 can also be used as a work area for the system controller 50.

The compression/expansion section 32 compresses or expands image data by adaptive discrete cosine transformation (ADCT) or the like. The compression/expansion section 32 reads image data stored in the memory 30 and performs compression or expansion processing on the read image data, and writes the processed data into the memory 30.

The shutter controller 40 controls the shutter 12 based on photometry information from the photometer unit 46 in cooperation with a diaphragm controller 340 which controls the diaphragm 312.

The range finder unit 42 performs the AF (auto-focus) processing. A ray of light incident through the photographic lens 310 is directed to the range finder unit 42 via the diaphragm 312 and a range-finding sub-mirror, not shown, whereby an in-focus state of an image formed as an optical image is measured.

A thermometer 44 detects an ambient temperature of the image pickup apparatus.

The photometer unit 46 performs the AE processing. A ray of light incident through the photographic lens 310 is directed to the photometry unit 46 via the diaphragm 312 and a photometric lens, not shown, whereby the exposure state of the image formed as an optical image is measured.

It should be noted that the system controller 50 controls the shutter controller 40, the diaphragm controller 340, and a range finder controller 342 based on results of computation performed by the image processor 20 on image data picked up by the image pickup device 14.

Exposure control and AF control can also be performed using a video TTL method. The AF control may be performed based on both results of measurement by the range finder unit 42 and results of computation performed by the image processor 20 on image data picked up by the image pickup device 14.

Further, the exposure control may be performed based on both results of measurement by the photometry unit 46 and results of computation performed by the image processor 20 on image data picked up by the image pickup device 14.

The system controller 50 controls the overall operation of the image processing unit 100. A memory 52 stores constants and variables for use in operation of the system controller 50, programs, and so forth.

A display unit 54 includes a liquid crystal display device, a speaker, etc., for displaying the operating state of the image processing unit 100 and messages, using characters, images, voices, and so forth, in accordance with execution of programs by the system controller 50. These devices are each provided at a single or a plurality of locations close to an operation unit of the image processing unit 100, where the devices are easily viewable. The display unit 54 is implemented e.g. by a combination of an LCD, LEDs, sounding elements, etc.

Examples of contents to be displayed by the display unit 54 include a single shot/continuous shot display, a self-timer display, a compression ratio display, a recording pixel number display, a recorded shot number display, a remaining shot number display, a shutter speed display, an f number display, an exposure correction display, and a red-eye reduction display.

Further, the contents to be displayed by the display unit 54 may include a macro shooting display, a beep setting display, a clock battery remaining power display, a remaining battery power display, an error display, an information display by a plurality of digits, an attached/detached state display for the storage units 200 and 210, and an attached/detached state display for the lens unit 300.

Furthermore, the contents to be displayed by the display unit 54 may include a communication interface operation display, a date and time display, a display indicating a state of connection to an external computer, a focusing display, a shooting-ready display, a camera shake warning display, and displays indicating respective flash charging and flash charged states of a flash unit 48.

The contents to be displayed by the display unit 54 also include a shutter speed display, an f number display, an exposure correction display, and a display indicating a write operation to a storage medium.

A nonvolatile memory 56 stores data in an electrically erasable and recordable manner. The nonvolatile memory 56 is implemented e.g. by an EEPROM.

Reference numerals 60, 61, 62, 64, 66, 68, 69, and 70 denote operation units for inputting various operation instructions to the system controller 50, and the operation units are each formed by one or a combination of two or more of a switch, a dial, a touch panel, an eye gaze direction detection-based pointing device, a voice recognition device, and so forth.

Next, the operation units will be described in more detail.

A mode dial 60 is a mode changeover switch for selectively starting one of an operation in the normal still image shooting mode and an operation in the moving image shooting mode. A shutter switch (SW1) 62 is turned on when a shutter button, not shown, is half operated, to provide an instruction for starting execution of the AF processing, the AE processing, the AWB processing, the EF (electronic flash pre-emission) processing, or the like processing.

A shutter switch (SW2) 64 is turned on when the shutter button, not shown, is fully operated. If the mode dial 60 is held off, the turn-on of the shutter switch 64 causes still image shooting to be started, while if the mode dial 60 is held on, the same causes moving image shooting to be started.

When the operation mode is switched to one of the shooting modes, exposure processing for writing a signal read from the image pickup device 14 into the memory 30 via the A/D converter 16 and the memory controller 22, and development processing using computation by the image processor 20 and the memory controller 22 are carried out.

Further, the shutter switch (SW2) 64 provides an instruction for starting execution of a sequence of processing for reading out image data from the memory 30, compressing the image data by the compression/expansion section 32, and writing the compressed image data into the storage unit 200 or 210.

A reproduction switch 66 provides, in a shooting mode, an instruction for starting a reproduction operation for reading out a picked-up image from the memory 30 or the storage unit 200 or 210 and then displaying the read-out image on the image display unit 28.

A single shot/continuous shooting switch 68 is capable of setting one of a single shot mode in which one frame of image is picked up upon depression of the shutter switch SW2 and then the image pickup apparatus enters a standby state, and a continuous shooting mode in which continuous shooting is performed as long as the shutter switch SW2 is held down.

An ISO sensitivity-setting switch 69 is capable of setting an ISO sensitivity by changing gain setting in the image pickup device 14 or the image processor 20.

The operation unit 70 includes various kinds of buttons and a touch panel, and the buttons include a menu button, a set button, a macro button, a multi-screen reproduction and page button, a flash setting button, and a single shot/continuous shooting/self timer mode-switching button.

Further, the operation unit 70 includes a menu moving + (plus) button, a menu moving − (minus) button, a reproduced image moving + (plus) button, a reproduced image moving − (minus) button, a shot image quality selection button, an exposure correction button, and a data/time setting button.

Furthermore, the operation unit 70 includes a selection/switching button for use in selecting and switching various functions for execution of shooting and reproduction in a panoramic mode or the like, and a determination/execution button for use in determining and executing various functions for execution of shooting and reproduction in the panoramic mode or the like.

The operation unit 70 also includes an image display ON/OFF switch for use in setting the ON/OFF state of the image display unit 28, and a quick review ON/OFF switch for use in setting a quick review function for automatically reproducing image data picked up immediately after shooting.

Further, the operation unit 70 includes a compression mode switch for use in selecting a compression ratio of JPEG compression or selecting a CCDRAW mode in which a signal from the image pickup device 14 is digitized and recorded in the storage unit 200 or 210 without compression.

The operation unit 70 further includes a reproduction switch which is capable of setting various function modes, such as a reproduction mode, a multi-screen reproduction/deletion mode, and a PC connection mode.

In addition, the operation unit 70 includes an AF mode setting switch. The AF mode setting switch is used to set a one-shot AF mode in which an autofocus operation starts by depression of the shutter switch SW1 and an in-focus state of an image is held once the in-focus state is obtained. Further, the AF mode setting switch is used to set a servo AF mode in which an autofocus operation is continuously performed while the shutter switch (SW1) 62 is kept pressed.

The functions of the above-mentioned plus and minus buttons can be improved by providing a rotary dial switch, to enable swift selection of numerical values and functions.

A power switch 72 is capable of switching the image processing unit 100 between the power-on state and the power-on state. Further, the power switch 72 is capable of switching Various accessories, such as the lens unit 300, an external strobe unit, and the storage units 200 and 210, each connected to the image processing unit 100, between the power-on state and the power-off state in accordance with the switching of the image processing unit 100 between the power-on state and the power-on state.

The system controller 50 measures the lapse of time using a real-time clock (RTC) 74 to thereby realize various timer functions.

A power supply controller 80 includes a battery detection circuit, a DC-DC converter, and a switch circuit for switching between blocks to be supplied with electric power. The power supply controller 80 detects whether or not a battery is mounted, the type of the battery, and the remaining capacity of the battery, controls the DC-DC converter based on the results of the detection and instructions from the system controller 50, and supplies a necessary voltage to each of components including the storage units over a required time period.

A power supply 86 is formed by a primary battery, such as an alkali battery or a lithium battery, or a secondary battery, such as an NiCd battery, an NiMH battery, or an Li battery, or an AC adapter. The power supply 86 is connected to the power supply controller 80 by connectors 82 and 84.

Interfaces (I/Fs) 90 and 94 are connected to the storage units 200 and 210, such as a memory card and a hard disk, via respective connectors 92 and 96. A storage unit attachment/detachment detector 98 detects whether or not the storage unit 200 and/or the storage unit 210 are/is attached to the connector 92 and/or the connector 96.

A communication unit 110 has various communication functions, such as RS232C, USB, IEEE 1394, P1284, SCSI, modem, LAN, and wireless communication. A connector 112 enables connection of a cable to the communication unit 110 to thereby connect the image processing unit 100 to an external device. In the case of radio communication, the connector 112 is implemented by an antenna.

An interface 120 connects the image processing unit 100 to the lens unit 300. A connector 122 electrically connects the image processing unit 100 to the lens unit 300. In the image processing unit 100, mirrors 130 and 132 are disposed upstream of the shutter 12.

The mirrors 130 and 132 direct a ray of light incident through the photographic lens 310 to an optical viewfinder 104 by the single-lens reflex method. The mirror 132 may be configured as a quick-return mirror or a half mirror.

The optical viewfinder 104 is capable of displaying an optical image which is formed by guiding thereto a ray of light entering the photographic lens 310 through the diaphragm 312, lens mounts 306 and 106, and the mirrors 130 and 132.

This arrangement makes it possible to perform a shooting operation using only the optical viewfinder 104 without using the electronic finder function of the image display unit 28.

Further, the optical viewfinder 104 is provided with some of the functions of the display unit 54, e.g. an in-focus display function, a camera shake warning display function, etc.

The storage unit 200 implemented e.g. by a memory card or a hard disk is comprised of a recording section 202 implemented by a semiconductor memory, a magnetic disk, or the like, an interface 204 for providing interface with the image processing unit 100, and a connector 206 for connection to the image processing unit 100.

Similarly, the storage unit 210 is comprised of a recording section 212 implemented by a semiconductor memory, a magnetic disk, or the like, an interface 214 for providing interface with the image processing unit 100, and a connector 216 for connection to the image processing unit 100.

The lens unit 300 has the lens mount 306 and a connector 322 thereof connected to the lens mount 106 and the connector 122 of the image processing unit 100, respectively. The connector 322 may be configured to enable not only electrical communication but also optical communication, audio communication, or the like. The connector 322 is connected to an interface 320. A known shake detection unit 360 is connected to the interface 320.

The diaphragm controller 340 controls the diaphragm 312 based on photometry information from the photometer unit 46 in cooperation with the shutter controller 40 that controls the shutter 12. The range finder controller 342 controls focusing of the photographic lens 310. A zoom controller 344 controls zooming of the photographic lens 310.

A lens controller 350 controls the overall operation of the lens unit 300 that performs a stopping-down operation, a range-finding operation, and a zoom operation. The lens controller 350 also includes a nonvolatile memory which stores constants, variables, programs, and the like for its operation, identification information, such as a number unique to the lens unit 300, management information, function information items such as a full-aperture f-number, a minimum f-number, and a focal length, and current and past set values.

Figure 2:
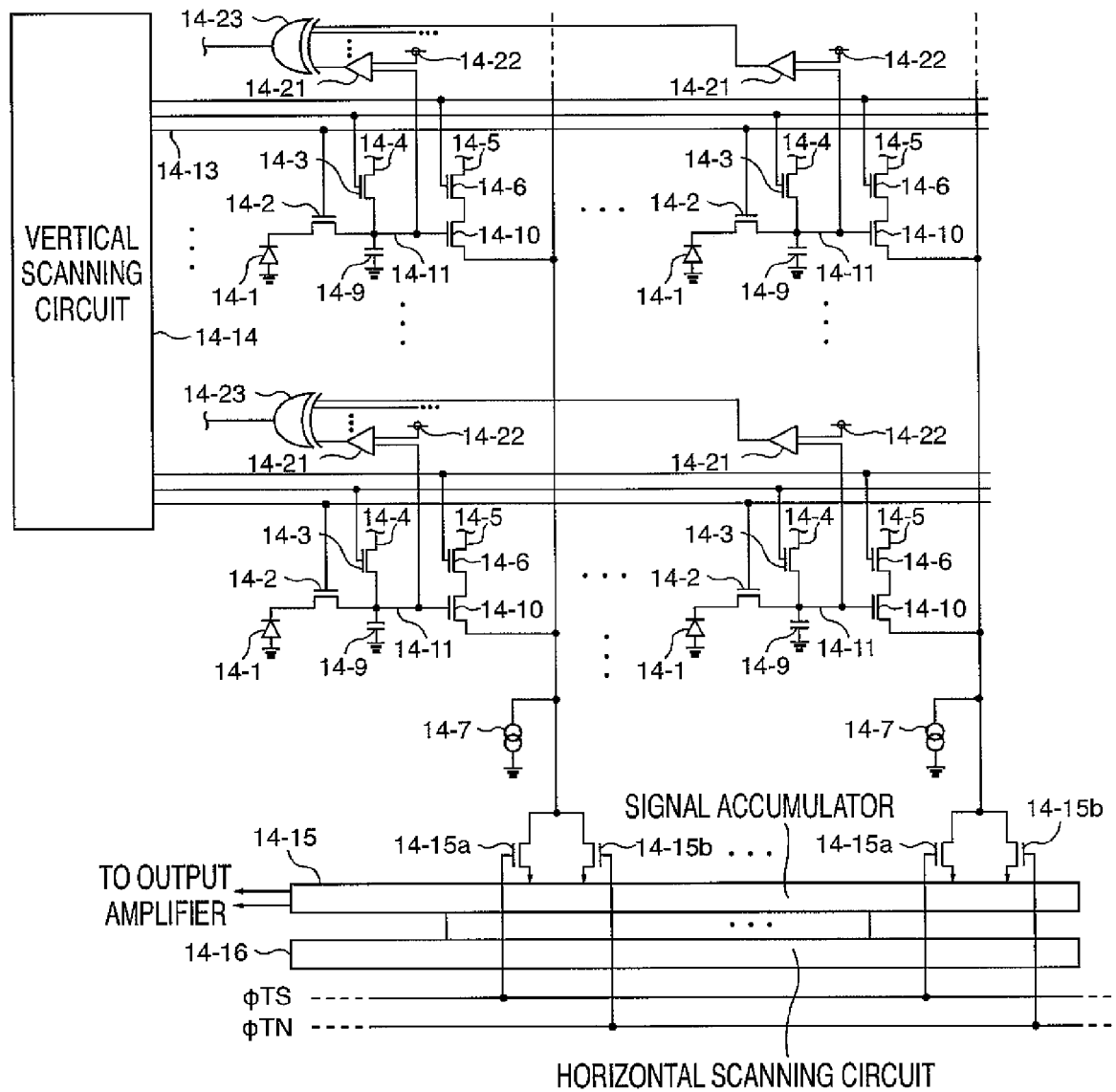
FIG. 2 is a circuit diagram of a pixel section of an image pickup device of the image pickup apparatus according to the first embodiment shown in FIG. 1.

FIG. 2 is a circuit diagram of a pixel section of the image pickup device (CMOS area sensor) in the image pickup apparatus in FIG. 1 according to the first embodiment.

Referring to FIG. 2, in each pixel, there are arranged a photodiode (PD) 14-1, a transfer switch (TX) 14-2, a reset switch (TRES) 14-3, a source follower (SF) 14-10 as a pixel amplifier, and a line selection switch (TSEL) 14-6.

The transfer switch (TX) 14-2 has a gate thereof connected to a control line FTX (n, n+1) from a vertical scanning circuit 14-14, and the reset switch (TRES) 14-3 has a gate thereof connected to a control line FRES (n, n+1) from the vertical scanning circuit 14-14. Further, the line selection switch (TSEL) 14-6 has a gate thereof connected to a control line FSEL (n, n+1) from the vertical scanning circuit 14-14.

Further, a gate 14-11 (floating diffusion (FD) gate; hereinafter also referred to as "FD") of the source follower (SF) 14-10 is connected to a comparator 14-21 for detecting the potential of the FD 14-11. The potential of the FD 14-11 and a comparison potential 14-22 of a predetermined level are input to the comparator 14-21.

In the present embodiment, the predetermined potential level corresponds to a predetermined level of electric charge which leaks by overcoming the barrier of the transfer switch 14-2 into the FD 14-11 when saturation occurs. The comparator 14-21 is configured to generate an output (output=1) when the predetermined level of leaking electric charge is accumulated at the FD 14-11.

Outputs of the comparator 14-21 corresponding to respective pixels are input to an OR element 14-23 in association with each predetermined group of pixels (each horizontal line in the first embodiment), and when charge leakage occurs in a predetermined group of pixels, the OR element 14-23 generates an output (output="1").

The comparator 14-21, the comparison potential 14-22, and the OR element 14-23 constitute a so-called output determination unit.

The output from the output determination unit is delivered to the system controller 50, and the system controller 50 transfers the information to the memory controller 22. The timing generator 18 changes timing and the like of control signals based on the information transferred to the memory controller 22.

It should be noted that although in the present embodiment, one detection is performed on a pixel-by-pixel basis, and comparison and determination is performed on a horizontal line-by-horizontal line basis, this is not limitative, but the output determination may be performed for each area defined e.g. by 5×5 pixels.

Photoelectric conversion is performed by the photodiode 14-1. The transfer switch 14-2 is held off during accumulation of photoelectric charge in the photodiode 14-1. This prevents electric charge obtained through photoelectric conversion by the photodiode 14-1 from being transferred to the gate 14-11 of the source follower 14-10 which forms a pixel amplifier.

However, when an object is a high luminance object, the amount of electric charge accumulated in the photodiode 14-1 can exceed the saturation level of the transfer switch 14-2, causing leakage of electric charge into the gate 14-11 of the source follower 14-10.

When the comparator 14-21 detects charge leakage to the gate 14-11 of the source follower 14-10 and electric charge accumulated at the gate 14-11 has reached the predetermined level, the output of the comparator turns on. Then, a signal is transmitted to the input of the OR element 14-23, and the OR element 14-23 transfers the signal to the memory controller 22 to indicate an area (line) where charge leakage has occurred.

The gate 14-11 of the source follower 14-10 basically has its voltage initialized to an appropriate level by turn-on of the reset switch 14-3 before starting of charge accumulation. This level provides a dark level.

When the line selection switch 14-6 is turned on subsequently or simultaneously, a load current source 14-7 and the source follower 14-10 are brought into an operating state. By turning on the transfer switch 14-2 at this time, electric charge accumulated in the photodiode 14-1 is transferred to the gate 14-11 of the source follower 14-10.

In FIG. 2, reference numeral 14-4 denotes a reset power supply, 14-5 a reference power supply for driving the source follower 14-10, and 14-9 a capacitor of the gate (FD gate) 14-11 of the source follower 14-10.

At this time, outputs from a selected line are generated on a vertical output line 14-13. These outputs are accumulated in a signal accumulator 14-15 via transfer gates 14-15a and 14-15b. The outputs temporarily stored in the signal accumulator 14-15 are sequentially read out into an output amplifier by a horizontal scanning circuit 14-16.

Figure 3:
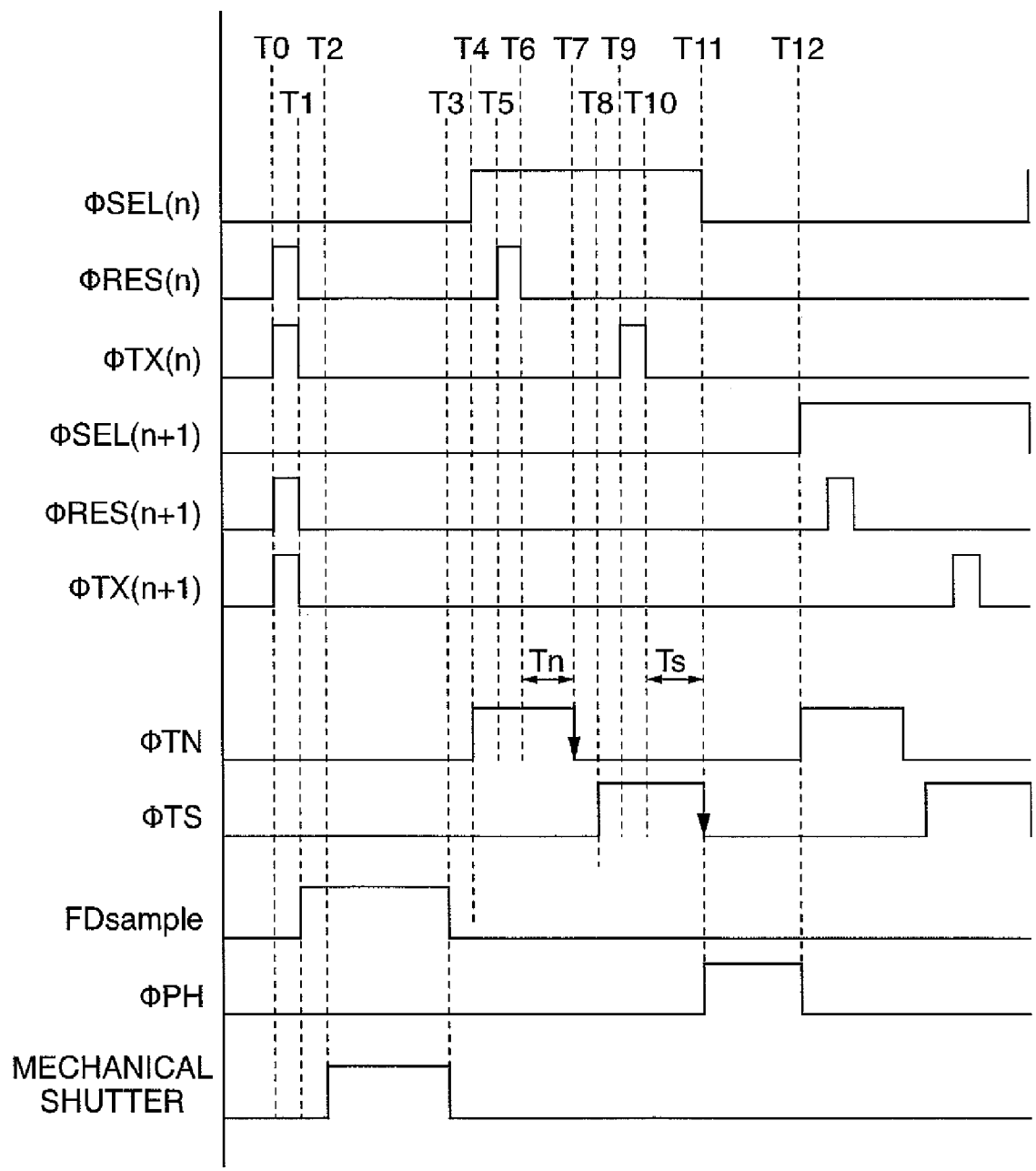
FIG. 3 is a timing diagram useful in explaining operational timing in the image pickup device in FIG. 2.

FIG. 3 is a timing diagram useful in explaining operational timing in the image pickup device in FIG. 2.

The operational timing in the image pickup device 14 is controlled by signals from the timing generator 18.

First, reset of the pixel section is started at time T0. At time T0, the control lines FTX(n), FTX(n+1), FRES(n), and FRES (n+1) are asserted.

In this state, electric charge in the cathode of the photodiode 14-1 has moved to the gate 14-11 of the source follower 14-10, and is averaged. By increasing the capacitive component of the capacitor 14-9 of the gate 14-11 of the source follower 14-10, the potential of the averaged electric charge becomes substantially equal to the level as obtained when the cathode of the photodiode 14-1 is reset.

Then, at time T1, the control lines FTX(n), FTX(n+1), FRES(n), and FRES(n+1) are negated. In this timing, charge accumulation is started. However, a mechanical shutter, not shown, remains closed.

At time T1, detection of charge leakage to the gate 14-11 of the source follower 14-10 by the determination unit (the comparator 14-21, the comparison potential 14-22, and the OR element 14-23) is started (illustrated as turn-on of FDsample in FIG. 3). When the accumulated electric charge exceeds the predetermined level, the determination unit delivers an output to the memory controller 22 to thereby transmit information on a line where charge leakage has occurred, i.e. information on a saturated line, which is then stored in the memory 30.

Then, at time T2, the shutter (mechanical shutter) 12 for guiding light from an image to be photographed opens, whereby an actual exposure operation is started. The shutter 12 is closed at time T3. In short, a time period T2 to T3 corresponds to an exposure period (charge accumulation period) of the image pickup apparatus.

It should be noted that when charge leakage to the gate 14-11 of the source follower 14-10 occurs during the exposure period (charge accumulation period) due to an exposure to a high-luminance object and the accumulated electric charge exceeds the predetermined level, the determination unit delivers an output to the memory controller 22, to thereby transmit information on a line where charge leakage has occurred, i.e. information on a saturated line, which is then stored in the memory 30.

At time T3, the detection of charge leakage to the gate 14-11 of the source follower 14-10 by the determination unit, which was started at time T1, is terminated (illustrated as turn-off of FDsample in FIG. 3). After time T4, line-by-line transfer operations are sequentially started. More specifically, reading operations for a n-th line and a (n+1)-th line are sequentially performed.

At time T4, the control line FSEL(n) is asserted to turn on the line selection switch 14-6, whereby each of the source followers 14-10 of all pixels arranged in the n-th line is brought into an operating state. At the same time, the control line FTN(n) is asserted, and the transfer gate 14-15b is kept on until time T7. In this timing, the transfer gate 14-15b starts to transfer electric charge to the signal accumulator 14-15.

Then, at time T5, the control line FRES(n) is asserted to turn on the reset switch 14-3, whereby electric charge in the gate 14-11 of the source follower 14-10 is initialized, i.e. set to the dark level.

The reset switch 14-3 is turned off at time T6, and stabilization of the electric charge in the gate 14-11 of the source follower 14-10 at the dark level is awaited during a time period Tn from T6 to T7.

Next, the control line FTN(n) is negated at time T7. This timing corresponds to a time at which the transfer of the electric charge at the signal output level to the signal accumulator 14-15 is terminated. This operation is carried out simultaneously in parallel for all the pixels arranged in the n-th line.

A time period T4 to T7 (including the stabilization-awaiting time period Tn) over which a signal output at the dark level is transferred to the signal accumulator 14-15, awaited to be stable, and held is referred to as the "N reading" period.

After the dark-level charge transfer to the signal accumulator 14-15 (N reading) is terminated (T7), at time T8, the control line FTS is asserted only during a time period T8 to T11 to keep the transfer gate 14-15b on until T11. In this timing, the transfer gate 14-15b starts to transfer electric charge to the signal accumulator 14-15.

Then, at time T9, the control line FTX(n) is asserted to turn on the transfer switch 14-2, whereby signal charge accumulated in the photodiode 14-1 is transferred to the gate 14-11 of the source follower 14-10.

At this time, the potential of the gate 14-11 of the source follower 14-10 changes from the initialized level (dark level) by an amount corresponding to the received signal charge to thereby finally define the signal level.

The transfer switch 14-2 is turned off at time T10, but stabilization of the electric charge in the gate 14-11 of the source follower 14-10 is awaited during a time period Ts from T10 to T11.

Next, the control line FTS (n) is negated at time T11. This timing corresponds to a time at which the transfer of the electric charge at the signal output level to the signal accumulator 14-15 is terminated. This operation is carried out simultaneously in parallel for all the pixels arranged in the n-th line.

A time period T8 to T11 (including the stabilization-awaiting time period Ts) over which a signal output at the output signal level is transferred to the signal accumulator 14-15, awaited to be stable, and held is referred to as the "S reading" period.

The total time period of the "N reading period" and the "S reading period" is referred to as a "charge transfer period". Further, the above-mentioned period T4 to T11 is referred to as a horizontal blanking period for one horizontal line.

It should be noted that in the present embodiment, "changing of the charge transfer period", which will be described hereinafter, is performed to change the aforementioned time period Ts (e.g. switch between 4 μsec and 8 μsec). However, the desired effect is sometimes obtained by changing the time period Tn, and therefore, changing of any part of the charge transfer period is within the spirit and scope of the present invention.

At a time point (T11) when the operation in the charge transfer period is terminated, the signal accumulator 14-15 stores the dark level and the signal level of each of all the pixels arranged in the n-th line, and the difference between the dark level and the signal level of each pixel is obtained. The calculation of the difference between the dark level and the signal level of each pixel cancels fixed pattern noise (FPN) caused by variation in a threshold voltage Vth between the source followers, and KTC noise made by the reset switch 14-3 at a reset time, whereby it is possible to obtain signals having a high S/N ratio with noise components removed therefrom.

The horizontal scanning circuit 14-16 horizontally scans dark-level and signal-level difference signals accumulated in the signal accumulator 14-15 and outputs them in a time-series manner at a time period from time T11 to time T12. This completes output from the n-th line. Similarly, the control lines FSEL(n+1), FRES(n+1), FTX(n+1), FTN, and FTS are driven as shown in FIG. 2, whereby signals in the (n+1)-th line can be read out as from the n-th line.

Figure 4:
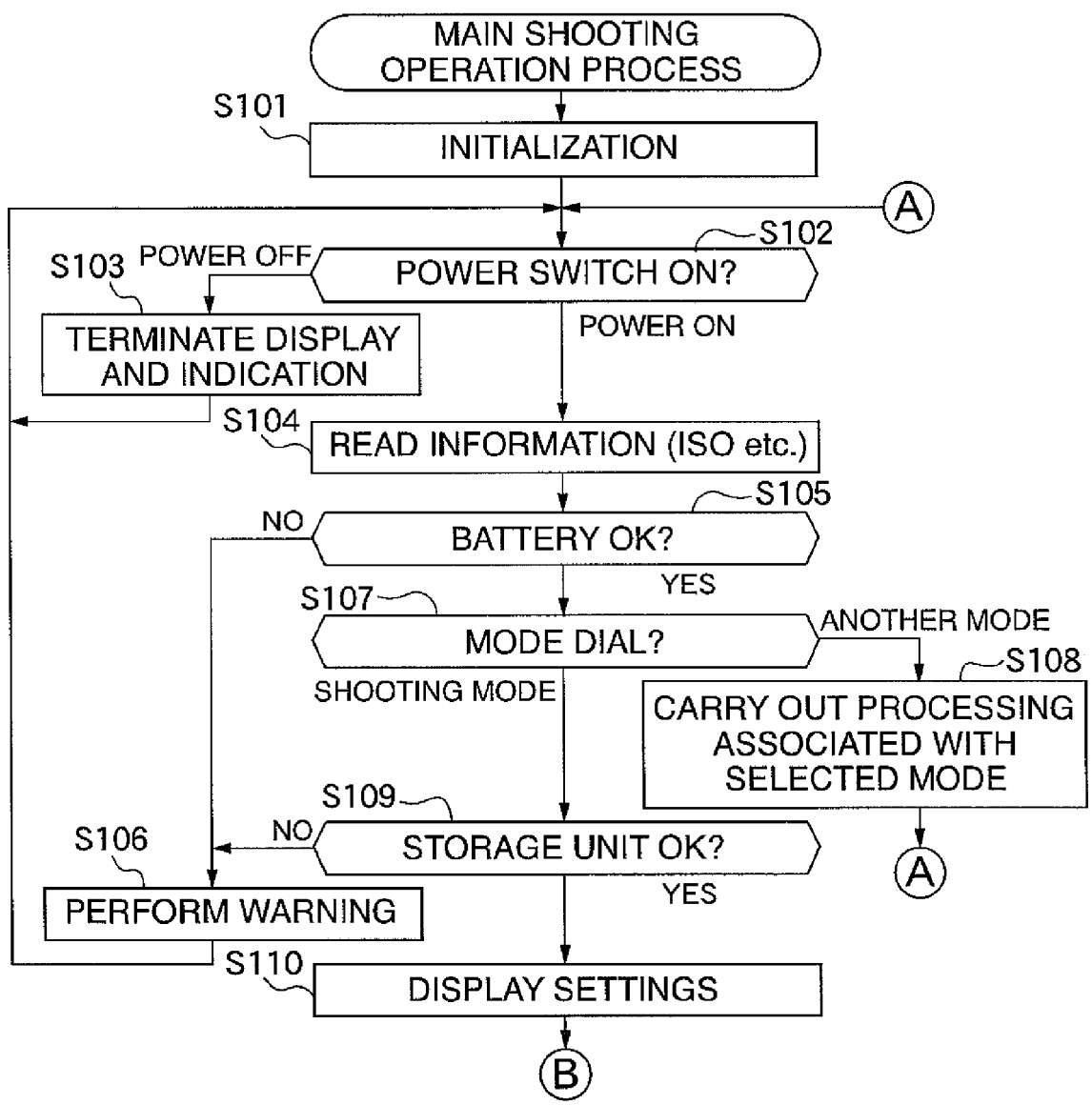
FIG. 4 is a flowchart of a main shooting operation process executed by an image processing unit of the image pickup apparatus according to the first embodiment shown in FIG. 1.
Figure 5:
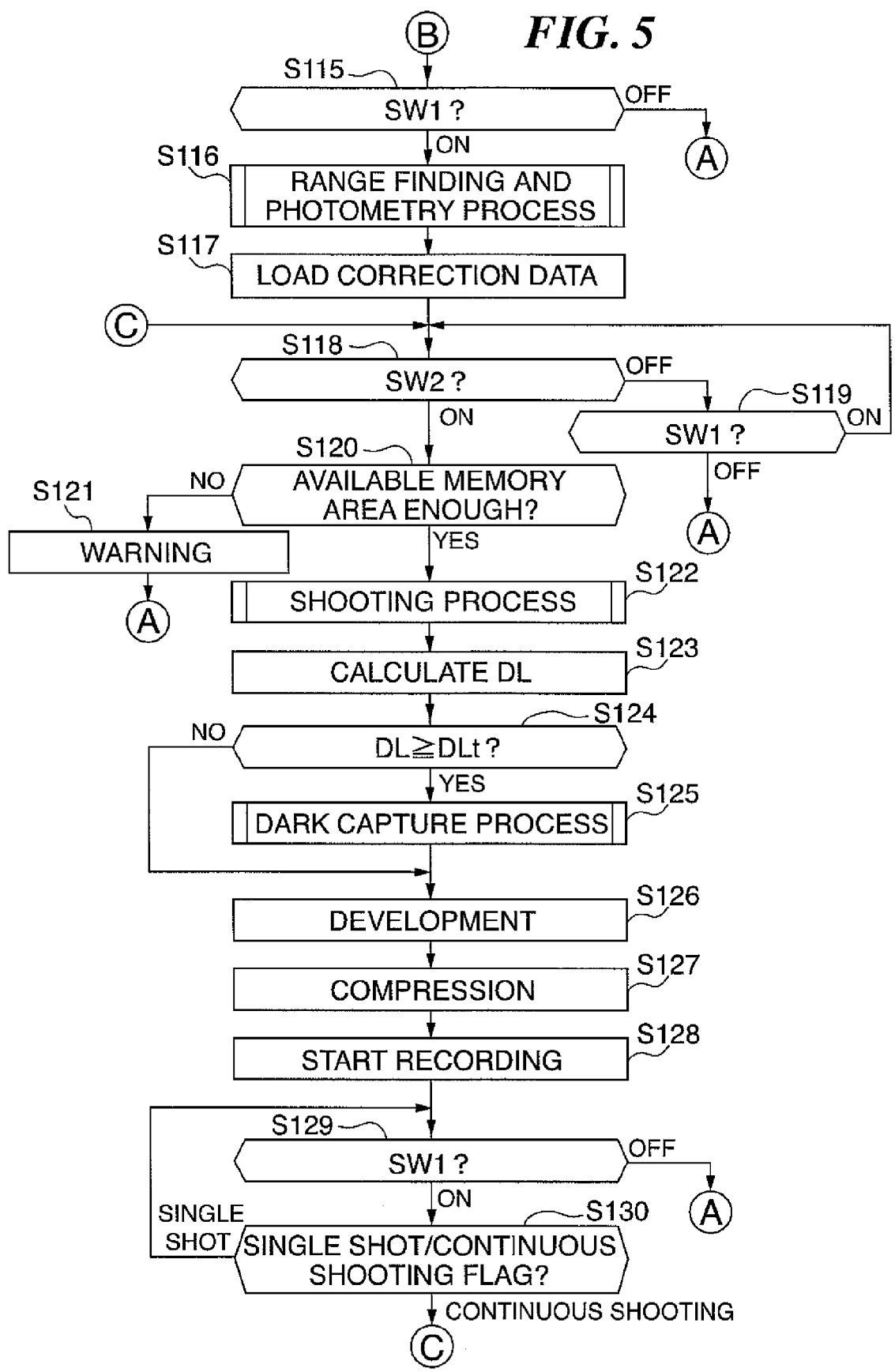
FIG. 5 is a continuation of the flowchart shown in FIG. 4.

FIGS. 4 and 5 are a flowchart of a main shooting operation process executed by the image processing unit in FIG. 1.

A program for this process is stored in the nonvolatile memory 56 or the like storage medium, and is loaded in the memory 52 and executed by a CPU of the system controller 50.

In a step S101, upon supply of power by battery replacement or the like, the system controller 50 initializes flags, control variables, and so forth, and performs necessary predetermined initialization of the sections and units of the image processing unit 100.

In a step S102, the system controller 50 determines the setting position of the power switch 72 to thereby determine whether or not the power switch 72 is off.

If the power switch 72 is off, displays and indications of the display units are terminated in a step S103, and necessary parameters and configuration values including the flags and the control variables, and a set mode are recorded in the nonvolatile memory 56. Then, the power supply controller 80 carries out predetermined termination processing for cutting off unnecessary power supply to the image display unit 28 and other units of the image processing unit 100, and then the process returns to the step S102.

In a step S104, configuration information including a set ISO sensitivity is transferred.

If it is determined in the step S102 that the power switch 72 is on, the system controller 50 causes the power supply controller 80 to determine in a step S105 whether or not the remaining capacity of the power supply 86 such as a battery and the operative condition of the same can cause trouble in the operation of the image processing unit 100. If it is determined that trouble can be caused, the process proceeds to a step S106, whereas if not, the process proceeds to a step S107.

In the step S106, predetermined warning is performed by displaying an image on the display unit 54 or outputting a voice, and then the process returns to the step S102.

In the step S107, the system controller 50 determines the setting position of the mode dial 60 to thereby determine whether or not the shooting mode is set by the mode dial 60. If another mode is set by the mode dial 60, the process proceeds to a step S108, whereas if the shooting mode is set by the mode dial 60, the process proceeds to a step S109.

In the step S108, processing corresponding to the selected mode is carried out, and then the present process returns to the step S102.

In the step S109, it is determined whether or not the storage unit 200 or 201 is mounted, and if the storage unit 200 or 201 is mounted, management information of image data recorded in the storage unit 200 or 201 is acquired. Further, in the step S109, it is determined whether or not the operating state of the storage unit 200 or 201 can cause trouble in the operation of the image processing unit 100, particularly in recording/reproduction of image data in/from the storage medium. If trouble can be caused, the process proceeds to the step S106, whereas if not, the process proceeds to a step S110.

In the step S110, various settings of the image processing unit 100 are displayed by images or voices, using the display unit 54. When the image display switch of the image display unit 28 is on, the settings of the image processing unit 100 are notified by images or voices, using the image display unit 28.

The process proceeds from the step S110 to a step S115 in FIG. 5, wherein it is determined whether or not the shutter switch SW1 has been pressed. If the shutter switch SW1 has not been pressed, the process returns to the step S102, whereas if the shutter switch SW1 has been pressed, the process proceeds to a step S116.

In the step S116, a range finding and photometry process is executed in which range finding processing is carried out to adjust the focus of the photographic lens 310 on an object, and photometry processing is carried out to determine the f number and the shutter speed. In the range finding processing, setting of a flash is performed if required. The range finding and photometry process will be described in detail hereinafter.

In a step S117, one-dimensional correction data stored in advance for use in horizontal dark shading correction is read from the nonvolatile memory 56, and then the process proceeds to a step S118.

In the step S118, it is determined whether or not the shutter switch SW2 has been pressed. If the shutter switch SW2 has not been pressed, the process proceeds to a step S119, whereas if the shutter switch SW2 has been pressed, the process proceeds to a step S120.

In the step S119, it is determined whether or not the shutter switch SW1 has been released. If the shutter switch SW1 has not been released, the process returns to the step S118, whereas if the shutter switch SW1 has been released, the process returns to the step S102.

In the step S120, the system controller 50 determines whether or not an image storage buffer area of the memory 30 has an available area large enough to store picked-up image data. If there is no available area for storing new image data in the image storage buffer area of the memory 30, the process returns to a step S121, whereas if there is an available area for storing new image data, the process returns to a step S122.

In the step S121, predetermined warning is performed by displaying an image on the display unit 54 or outputting a voice, and then the process returns to the step S102.

Examples of the case where there is no available area for storing new image data in the image storage buffer area of the memory 30 include a case where immediately after continuous shooting of a maximum number of images storable in the image storage buffer area of the memory 30 has been performed, a first image to be read from the memory 30 and written into the storage unit 200 or 210 has not been recorded in the storage unit 200 or 210 yet. In this state, it is impossible to secure an available area for storing even a single image, in the image storage buffer area of the memory 30.

It should be noted that in a case where picked-up image data is stored in the image storage buffer area of the memory 30 after having been compressed, it is to be considered that the amount of the compressed image data varies according to the configuration of a compression mode. Then, it is determined in the step S119 whether or not there is an available area large enough to store the data in the image storage buffer area of the memory 30.

In the step S122, the system controller 50 executes a shooting process in which an image pickup signal obtained by shooting and accumulated over a predetermined time period is read out from the image pickup device 14 and the picked-up image data is written in a predetermined area of the memory 30 via the A/D converter 16, the image processor 20, and the memory controller 22, or via the memory controller 22 directly from the A/D converter 16.

It should be noted that the operation of the image pickup device in the present step is carried out while changing the setting of the charge transfer period based on the result of line-by-line determination by the determination unit during a charge accumulation period (described with reference to FIG. 2). Details thereof will be described hereinafter with reference to FIG. 7.

In a step S123, the system controller 50 calculates a dark output level (hereinafter referred to as "the DL") from some of image data written in the memory 30, which corresponds to a DL detection area of the image pickup device 14.

In a step S124, the DL acquired in the step S122 is compared with a predetermined value DLt. If the DL is lower than the DLt, the process immediately proceeds to a step S126.

Therefore, in this case, a dark capture process is omitted, but in the development processing in the step S126, the image data captured in the step S122 is corrected based on the horizontal dark shading correction data stored in advance. When the DL is low, dark current is small, and noise components, such as fixed pattern noise components, other than the dark current are dominant, and hence it is possible to perform sufficient correction using the horizontal dark shading correction data.

When the DL acquired in the step S123 is high, dark current is large, and hence dark current-induced noise components generated due to a pixel loss caused by a fine flaw or dark current irregularities cannot be ignored, which makes it impossible to perform sufficient correction using the horizontal dark shading correction data.

If the DL is not lower than the predetermined value in the step S124, in a step S125, the shutter controller 50 executes the dark capture process in which dark current-induced noise components generated in the image pickup device 14 are accumulated over the same time period as required for actual shooting, with the shutter 12 held in its closed state, and an accumulated noise image signal is read out.

In the step S126, the system controller 50 carries out processing required for reading out part of the image data written in the predetermined area of the memory 30 via the memory controller 22 and developing the same.

More specifically, the system controller 50 carries out a WB (White Balance) integrating operation and an OB (Optical Black) integrating operation, and stores computation results in an internal memory of the system controller 50 or in the memory 52.

Further, the system controller 50 reads out the picked-up image data written in the predetermined area of the memory 30, using the memory controller 22, and, if required, the image processor 20. Then, the system controller 50 executes various kinds of development processing including AWB (Auto White Balance) processing, gamma conversion, and color conversion using the computation results stored in the internal memory of the system controller 50 or in the memory 52.

In the development processing, if the dark capture process (step S125) has been executed, subtraction processing is carried out using the dark image data, whereas if the dark capture process has not been executed, subtraction processing is carried out using the horizontal dark shading correction data loaded in the step S117. At the same time, a dark correcting operation is carried out for canceling the fixed pattern noise, the dark current noise, and the like of the image pickup device 14.

In the case of carrying out the correcting operation using the horizontal dark shading correction data, it is possible to perform correction, without executing the dark capture process during a shooting operation, to prevent degradation of image quality due to horizontal fixed pattern noise generated in the image pickup device 14.

On the other hand, in the case of carrying out the correcting operation using the dark image data captured in the dark capture process, it is possible to correct picked-up image data to prevent degradation of image quality due to horizontal fixed pattern noise generated in the image pickup device 14. In this case, the picked-up image data can be corrected to prevent degradation of image quality caused by dark current-induced noise components generated due to a pixel loss caused by a fine flaw or dark current irregularities.

In a step S127, the system controller 50 reads out the image data written in the predetermined area of the memory 30 and performs image compression corresponding to the set compression mode, on the image data, using the compression/expansion section 32. Then, the system controller 50 writes the image data picked up and having undergone the above-described sequence of processing in an available area of the image storage buffer area of the memory 30.

In a step S128, the system controller 50 reads out the image data stored in the image storage buffer area of the memory 30, and starts recording processing for writing the read-out image data in the storage unit 200 or 210 via the interface 90 or 94 and the connector 92 or 96.

This recording processing is carried out whenever image data picked up and having undergone the above-described sequence of processing is written anew in an available area of the image storage buffer area of the memory 30.

It should be noted that during writing of image data in the storage unit 200 or 201, a display or an indication indicating execution of write operation to a storage medium is given via the display unit 54 e.g. by blinking the LED, so as to indicate that the write operation is currently being performed.

In a step S129, the system controller 50 determines whether or not the shutter switch SW1 has been pressed. If the shutter switch SW1 is in a released state, the process returns to the step S102, whereas the shutter switch SW1 is in a pressed state, the process proceeds to a step S130.

In the step S130, the status of a single shot/continuous shooting flag stored in the internal memory of the system controller 50 or in the memory 52 is determined. If the flag is set to the single shot, the process returns to the step S129, and the steps S129 and S130 are repeatedly carried out until the shutter switch SW1 is released. On the other hand, if the flag is set to the continuous shooting (high-speed continuous shooting and low-speed continuous shooting), the process returns to the step S118 to be on standby for a next shooting. This completes the sequence of processing concerning the photographing of an image.

Figure 6:
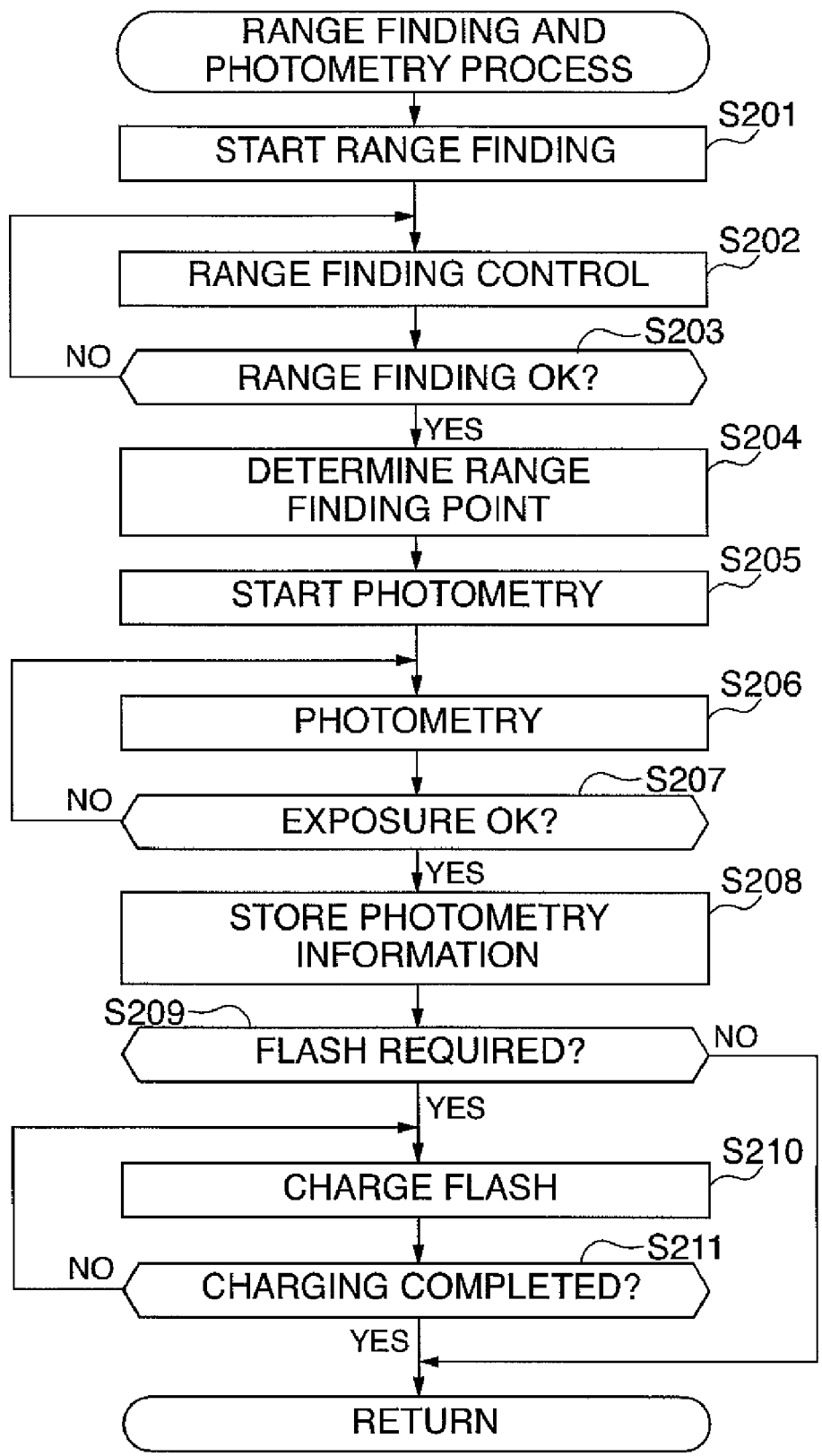
FIG. 6 is a flowchart of a range finding and photometry process executed in a step S116 in FIG. 5.

FIG. 6 is a flowchart of the range finding and photometry process executed in the step S116 in FIG. 5.

In the range finding and photometry process, exchange of various signals between the system controller 50 and the diaphragm controller 340 or the range finder controller 342 is performed via the interface 120, the connector 122, the connector 322, the interface 320, and the lens controller 350.

In a step S201, the AF (Auto-Focus) processing is started using the image pickup device 14, the range finder unit 42, and the range finder controller 342.

In steps S202 and S203, it is determined whether or not an image is in in-focus which is formed as an optical image by directing a ray of light incident through the photographic lens 310 to the range finder unit 42 via the diaphragm 312, the lens mounts 306 and 106, the mirror 130, and the range-finding sub-mirror (not shown).

The AF control is executed for detecting an in-focus state of an image using the range finder unit 42 while driving the photographic lens 310 using the range finder unit 342 until the image formed for range finding is determined to be in focus. If the image formed for range finding is determined to be in focus, the process proceeds to a step S204.

In the step S204, the system controller 50 selects one range-finding point (in-focus point) from a plurality of range-finding points in a photographic image plane. Then, the system controller 50 stores range finding data and/or set parameters in the internal memory of the system controller 50 or in the memory 52 together with data of the range-finding point determined as the in-focus point.

In a step S205, AE (Automatic Exposure) processing is started using the photometer unit 46.

In steps S206 and S207, a ray of light incident through the photographic lens 310 is directed to the photometer unit 46 via the diaphragm 312, the lens mounts 306 and 106, the mirrors 130 and 132, and the photometric lens (not shown). This causes the exposure state of the image formed as an optical image to be measured, and the photometry processing is performed using the shutter controller 40 until an exposure is determined to be correct.

When it is determined in the step S207 that the exposure is correct, in a step S208, the system controller 50 determines photometry data by selecting a photometric point from a plurality of photometric points within the photographic image plane. Then, the system controller 50 stores the photometry data and/or set parameters in the internal memory of the system controller 50 or in the memory 52.

By the way, whether or not an exposure is correct is generally determined based on information obtained by averaging all the photometric information items on a plurality of photometric points. However, in some modes, the determination is performed using some of the photometric points (e.g. one central point, several central points, or a linked range-finding point).

A method of determining correct photometry is not directly related to the present invention, and therefore it is assumed that a well-known method is employed.

It should be noted that the system controller 50 determines an f number (Av value) and a shutter speed (Tv value) according to the result of the exposure in the photometry processing in the step S206, a shooting mode set by the mode dial 60, and the ISO sensitivity set by the ISO sensitivity-setting switch 69.

The system controller 50 determines a charge accumulation period for accumulation of electric charge in the image pickup device 14, according to the determined shutter speed, and carries out the shooting process and the dark capture process based on the determined charge accumulation period.

In a step S209, the system controller 50 determines, based on the measurement data obtained in the photometry processing carried out in the steps S206 to S208, whether or not a flash is required.

If it is determined in the step S209 that a flash is required, in steps S210 and S211, a flash flag is set and the flash unit 48 is charged until fully charged. Then, when the flash unit 48 is fully charged, the present process is terminated, and the program returns to the main process.

Figure 7A:
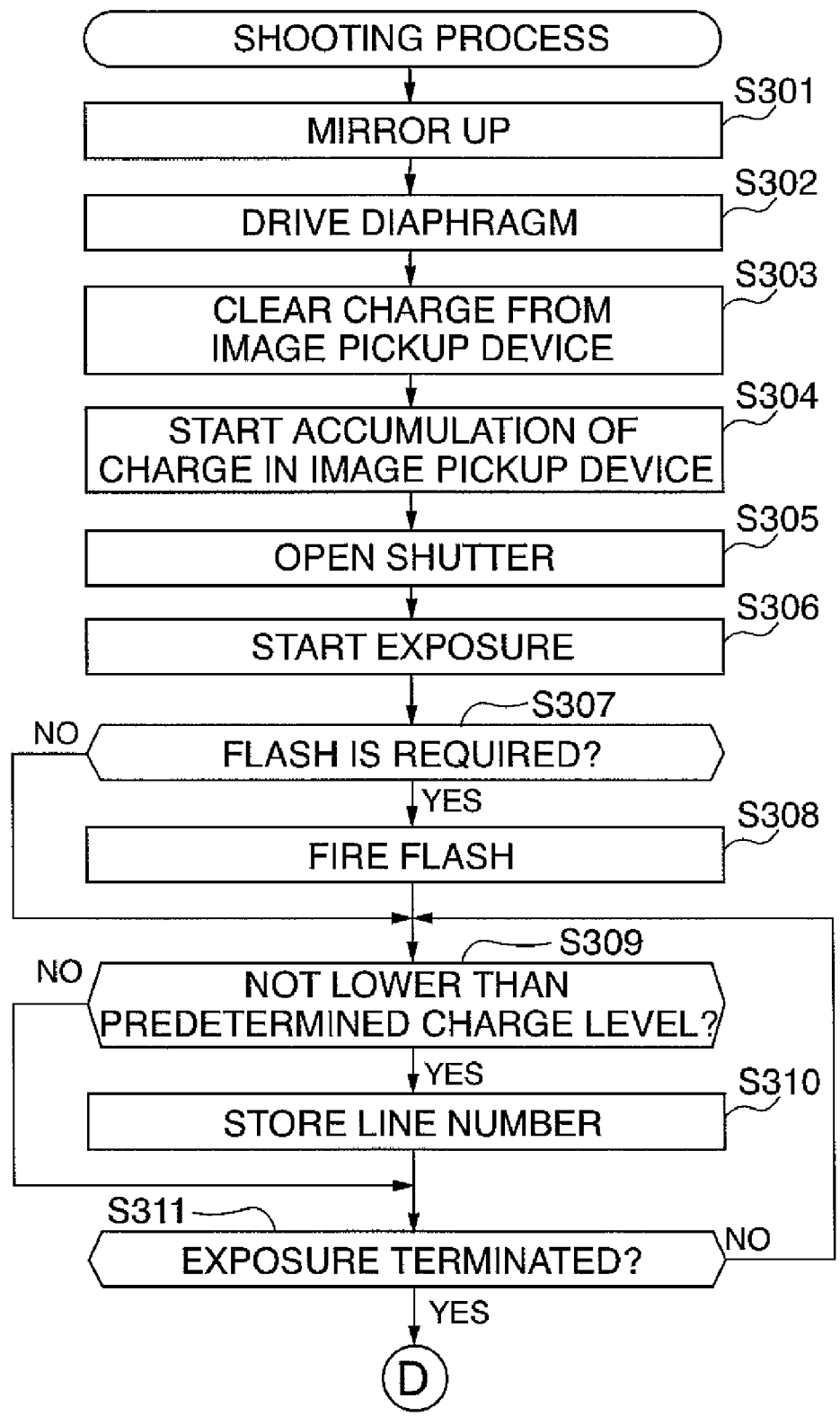
FIG. 7 is a flowchart of a shooting process (first shooting process) executed in a step S122 in FIG. 5.
Figure 7B:
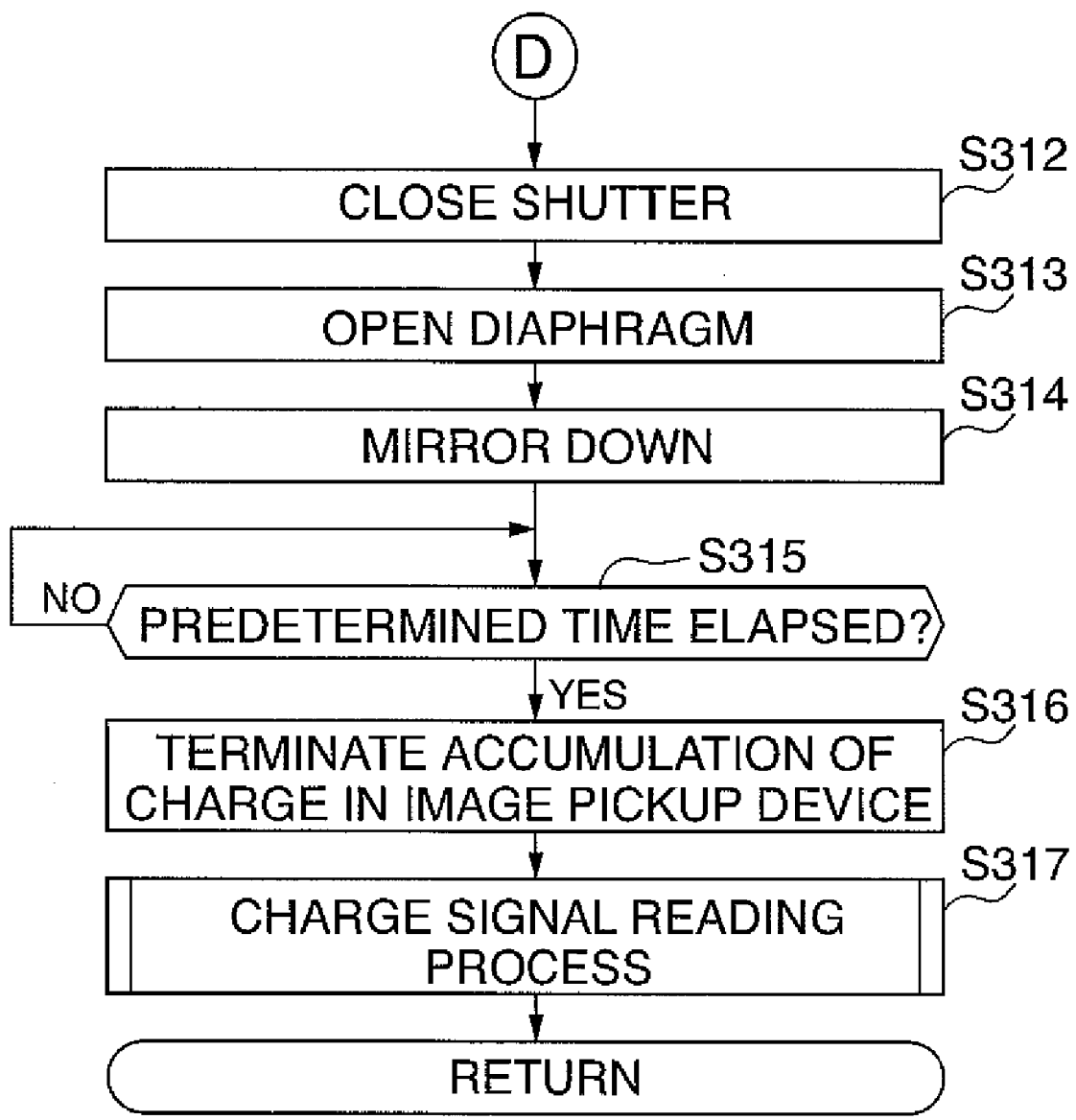

FIG. 7 is a flowchart of a shooting process (first shooting process) executed in the step S122 in FIG. 5.

In this shooting process, exchange of various signals between the system controller 50 and the diaphragm controller 340 or the range finder controller 342 is performed via the interface 120, the connector 122, the connector 322, the interface 320, and the lens controller 350.

In a step S301, the system controller 50 causes a mirror driver (not shown) to move the mirror 130 to a mirror-up position.

In a step S302, the diaphragm 312 is driven to a predetermined f number by the diaphragm controller 340 according to the photometry data stored in the internal memory of the system controller 50 or in the memory 52.

In a step S303, the system controller 50 performs charge clearing of the image pickup device 14.

In steps S304 and S305, accumulation of electric charge in the image pickup device 14 is started, and the shutter controller 40 opens the shutter 12 to start exposure of the image pickup device 14.

It should be noted that monitoring of the level of output (charge leakage) to the gate 14-11 of the source follower 14-10 during charge accumulation, described with reference to FIG. 2, is started in the step S304.

In steps S307 and S308, it is determined, based on the flash flag, whether or not a flash is required, and if a flash is required, the flash unit 48 is caused to fire a flash.

In steps S309 and S310, the level of output (charge leakage) to the gate 14-11 of the source follower 14-10, the monitoring of which is started in the step S304, is determined by the determination unit (the comparator 14-21, the comparison potential 14-22, and the OR element 14-23). Then, if the output level is not lower than a predetermined value, information on a line having the output level not lower than the predetermined value is transmitted to the memory controller 22 and stored therein.

In a step S311, it is determined whether or not a shutter open time period has elapsed, based on seconds set for the shutter open time period. If the shutter open time period has not elapsed, the process returns to the step S309, whereas if the shutter open time period has elapsed, the process proceeds to a step S312, wherein the shutter 12 is closed.

At a time point of termination of the step S312, the monitoring of the level of output (monitoring for charge leakage) to the gate 14-11 of the source follower 14-10 is terminated.

In general, it is desirable that the monitoring for charge leakage is continued until charge accumulation is terminated in a step S316, but in the present embodiment, the monitoring is terminated upon closing of the shutter for convenience of description.

In steps S313 and S314, the system controller 50 causes the diaphragm controller 340 to drive the diaphragm 312 to an full-open f number and causes a mirror driver (not shown) to move the mirror 130 to a mirror-down position.

In a step S315 and the step S316, it is determined whether or not the set charge accumulation period has elapsed, and if the set charge accumulation period has elapsed, the system controller 50 terminates the accumulation of electric charge in the image pickup device 14.

In a step S317, the system controller 50 reads a charge signal from the image pickup device 14, and writes picked-up image data into the predetermined area of the memory 30 via the A/D converter 16, the image processor 20, and the memory controller 22, or directly from the A/D converter 16 via the memory controller 22.

It should be noted that in the step S317, the operation for transfer of electric charges from image pickup device 14, described hereinbefore with reference to FIG. 3, is executed, and reading of charge signals from a line having a pixel with electric charge not lower than a predetermined electric charge is performed by extending the charge transfer period (the time period Ts in FIG. 3 in the present embodiment) based on the information stored in the step S310.

Upon completion of the sequence of processing, the shooting process is terminated, and the process returns to the main process.

Although in the present embodiment, the charge transfer period is changed by changing the time period Ts for "S reading", shown in FIG. 3, this is not limitative, but the same advantageous effect can also be obtained by setting the time for stabilization of the power supply based on the method of changing a stabilization-awaiting time period in timing in which the power supply has an influence, e.g. by changing the "N reading period" Tn. Further, the same advantageous effect can be obtained by changing a plurality of time periods (Tn, Ts, etc.) depending on conditions set therefor.

Figure 8:
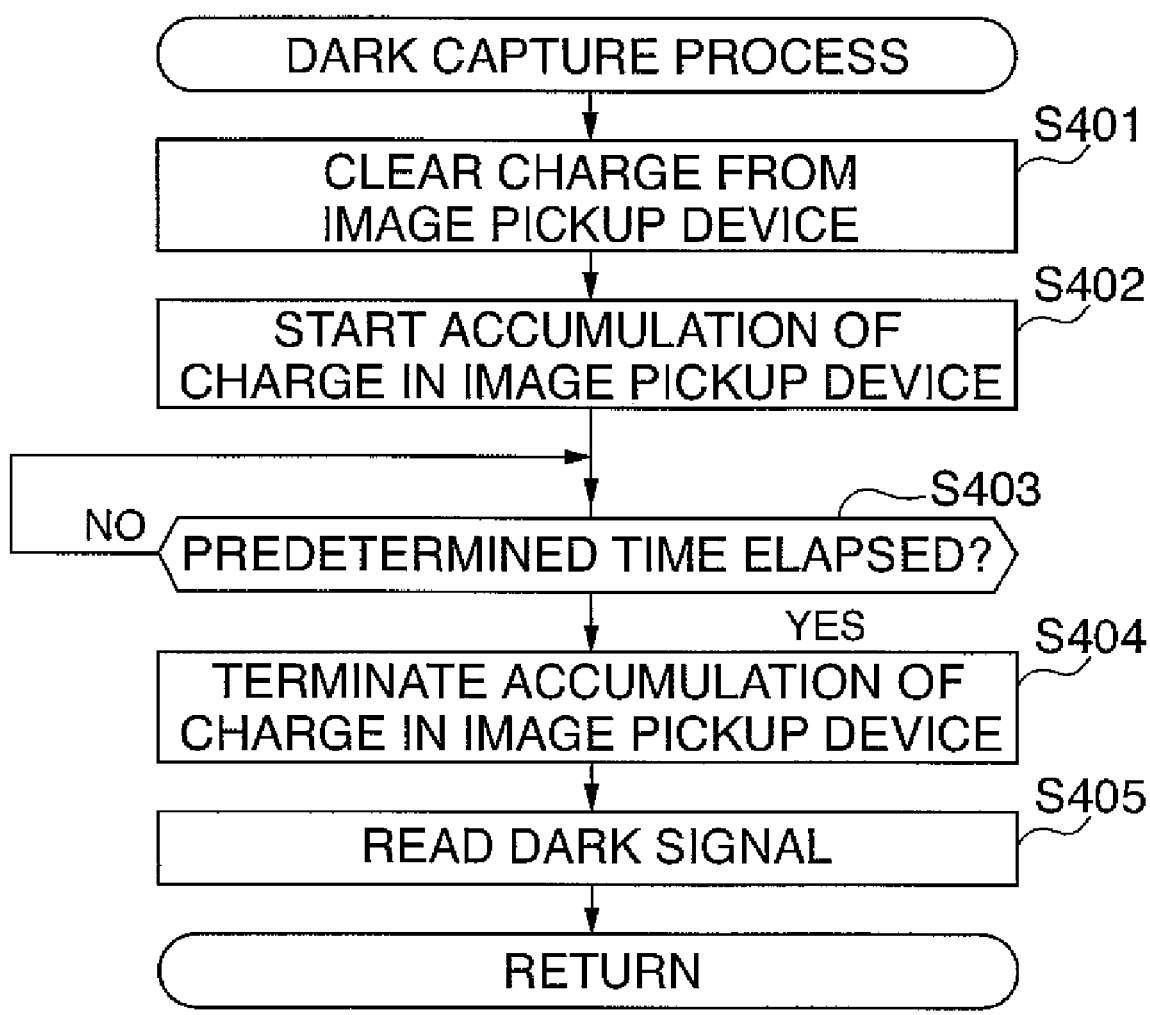
FIG. 8 is a flowchart of a dark capture process executed in a step S125 in FIG. 5.

FIG. 8 is a flowchart of the dark capture process executed in the step S125 in FIG. 5.

In a step S401, the system controller 50 performs charge clearing of the image pickup device 14.

In a step S402, accumulation of electric charge in the image pickup device 14 is started with the shutter 12 closed.

In a step S403, it is determined whether or not the set predetermined charge accumulation period has elapsed. If the charge accumulation period has elapsed, the process proceeds to a step S404.

In the step S404, the system controller 50 terminates charge accumulation in the image pickup device 14.

In a step S405, the system controller 50 reads out charge signals from the image pickup device 14, and writes dark image data into a predetermined area of the memory 30 via the A/D converter 16, the image processor 20, and the memory controller 22, or directly from the A/D converter 16 via the memory controller 22. Then, the dark capture process is terminated, and the process returns to the main process.

The dark image data is used in the case of carrying out the development processing in a state where image data picked up by the shooting process executed in advance has been read out from the image pickup device 14 and written in the memory 30.

It should be noted that in acquiring dark image data, a shooting operation is performed with the same setting of the charge transfer period applied when acquiring the image data picked up in advance.

Next, a second embodiment of the present invention will be described mainly with reference to FIGS. 9 and 10. In the first embodiment of the present invention described above, the output level of a predetermined area (each line) is determined during exposure in actual shooting to thereby determine the charge transfer period. The second embodiment of the present invention is distinguished from the first embodiment in that the output level is determined in advance during a pre-shooting operation for checking before actual shooting (e.g. during a composition-checking operation performed in an electronic finder mode), and the result of the determination is reflected in the actual shooting.

The configuration of the second embodiment is basically the same as that of the first embodiment. Therefore, duplicate description of components corresponding to those in the first embodiment is omitted by denoting them using the same reference numerals, and only different points from the first embodiment will be described.

Figure 9A:
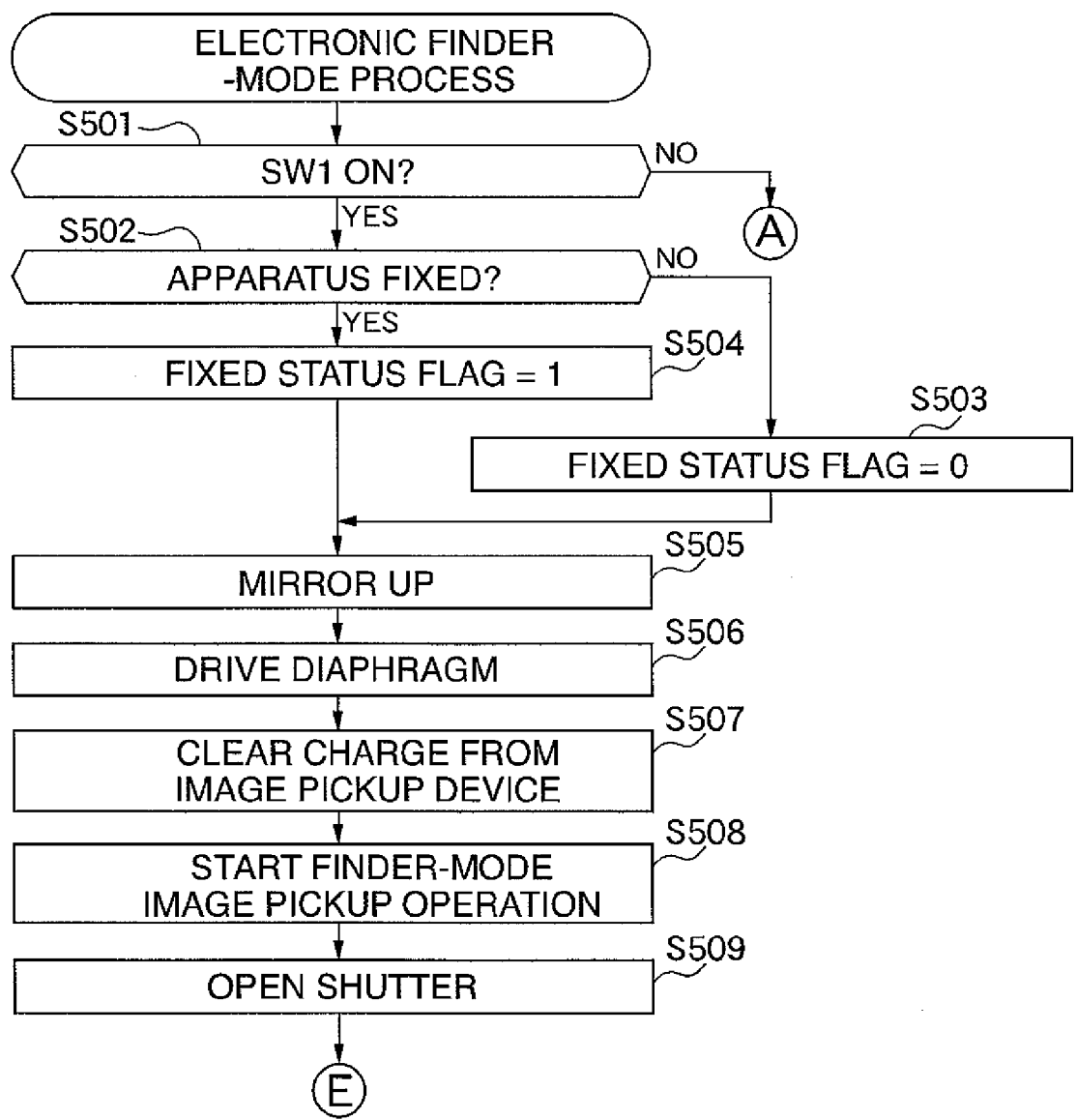
FIG. 9 is a flowchart of an electronic finder-mode process (first electronic finder-mode process) executed by an image processing unit of an image pickup apparatus according to a second embodiment of the present invention.

FIG. 9 is a flowchart of an electronic finder-mode process (first electronic finder-mode process) executed by an image processing unit of an image pickup apparatus according to the second embodiment.

This process starts operation when it is determined in the step S107 of the shooting operation process executed by the image processing unit 100, described hereinabove with reference to FIGS. 4 and 5, that the mode dial 60 is set to the electronic finder mode.

It should be noted that in the electronic finder mode, an exposure (line-by-line exposure) operation is performed using a rolling shutter for continuously carrying out accumulation, transfer/reading, and reset on a line-by-line basis (this operation is well-known, and hence detailed description thereof is omitted).

In a step S501, it is determined whether or not the shutter switch SW1 has been pressed. If the shutter switch SW1 has not been pressed, the process returns to the step S102 in FIG. 4, whereas if the shutter switch SW1 has been pressed, the process proceeds to a step S502.

In the step S502, the state of a tripod detection unit in the operation unit 70 is detected. If the tripod detection unit is not fixed, it is judged that the image pickup apparatus is not stationary, and hence the process proceeds to a step S503, wherein a fixed status flag is set to 0. On the other hand, if the tripod detection unit is fixed, it is judged that the image pickup apparatus is stationary, and hence the process proceeds to a step S504, wherein the fixed status flag is set to 1. Then, the process proceeds to a step S505.

In the step S505, the system controller 50 causes the mirror driver (not shown) to move the mirror 130 to the mirror-up position.

In a step S506, the diaphragm 312 is driven to the predetermined f number by the diaphragm controller 340 according to the photometry data stored in the internal memory of the system controller 50 or in the memory 52.

In a step S507, the system controller 50 performs charge clearing of the image pickup device 14.

In steps S508 to S510, accumulation of electric charge in the image pickup device 14 is started, and the shutter controller 40 opens the shutter 12 to start exposure of the image pickup device 14.

It should be noted that monitoring of the level of output (charge leakage) to the gate 14-11 of the source follower 14-10 in the charge accumulation, described with reference to FIG. 2, is started in the step S510.

Further, the present process is executed in a rolling shutter mode, and in parallel with the charge accumulation, transfer/reading operations for the other lines are carried out in parallel (the rolling shutter mode is well-known, and hence detailed description thereof is omitted).

In a step S511, the fixed state (fixed status flag) set in the steps S502 to 504 is confirmed. If the tripod detection unit is fixed, the process proceeds to a step S512, whereas if not, the process proceeds to a step S514.

In the step S512 and a step S513, the level of output (charge leakage) to the gate 14-11 of the source follower 14-10, the monitoring of which is started in the step S510, is determined by the determination unit. Then, if the output level is not lower than a predetermined value, information on a line having the output level not lower than the predetermined value is transmitted to the memory controller 22 so as to be stored therein.

It should be noted that the information stored in the step S513 is cleared upon the start of re-accumulation of electric charge in the same line in the rolling shutter mode, and then the determining operation is performed again.

In a step S514, it is determined whether or not the shutter switch SW1 has been turned off. If the shutter switch SW1 has not been turned off, the process proceeds to a step S515, whereas if the shutter switch SW1 has been turned off, the process proceeds to a step S516.

In the step S515, it is determined whether or not the shutter switch SW2 has been turned on. If the shutter switch SW2 has not been turned on, the process returns to the step S510 to continue the exposure operation. On the other hand, if the shutter switch SW2 has been turned on, the process proceeds to the step S118 in FIG. 5.

In the step S516, it is determined whether or not charge accumulation for one frame has been completed. If charge accumulation for one frame has not been completed, the process returns to the step S511, and the steps S511 to S516 are repeatedly carried out until the charge accumulation for one frame is completed. Then, when the charge accumulation for one frame is completed, the process proceeds to a step S517.

A line for which charge accumulation has been completed in the step S516 is placed in a reset state when the sequence of processing from the transfer/reading to the reset is completed.

In the step S517 and the following steps S518 to S520, the shutter 12 is closed, the monitoring of the level of output (charge leakage) to the gate 14-11 of the source follower 14-10 is terminated, and the diaphragm 312 is driven to the full-open f number by the diaphragm controller 340. Further, the mirror 130 is moved to the mirror-down position by the mirror driver (not shown). Then, it is determined whether or not the set charge accumulation period has elapsed. If the set charge accumulation period has elapsed, the system controller 50 terminates the accumulation of electric charge in the image pickup device 14. Then, the process returns to the step S102 in FIG. 4, wherein the system controller 50 enters a standby state.

It should be noted that the information on the detection and the result of the determination as to the level of output (charge leakage) during the charge accumulation, which are stored during execution of the present process, are reset upon termination of the step S520.

Figure 10:
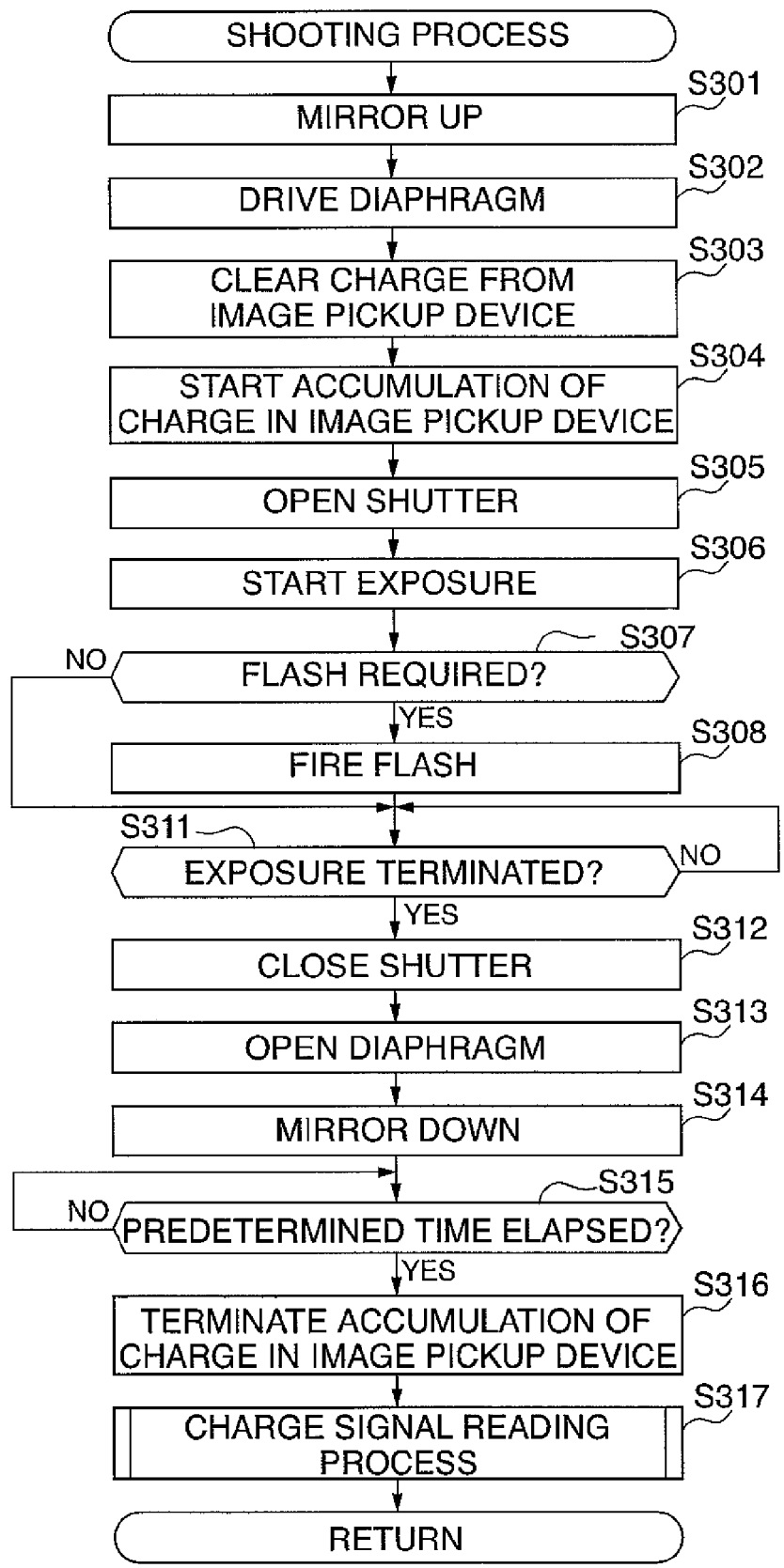
FIG. 10 is a flowchart of a shooting process (second shooting process) executed by the image processing unit of the image pickup apparatus according to the second embodiment.

FIG. 10 is a flowchart of a shooting process (second shooting process) which is executed by the image processing unit of the image pickup apparatus according to the second embodiment in a step corresponding to the step S122 in FIG. 5, described in the first embodiment.

The present process is basically similar to the FIG. 7 process in the first embodiment, and therefore a description will be given only of different points from the FIG. 7 process.

Operations in the steps S309 and S310 are carried out in the steps S512 and S513 in FIG. 9, and hence the steps S309 and S310 are omitted.

Further, in the step S317 for transfer of an image pickup signal, reading of a charge signal from a line having a pixel with electric charge not lower than a predetermined electric charge is performed by extending the charge transfer period (the time period Ts in FIG. 3, in the present embodiment) based on a result set in the steps S512 and S513 in FIG. 9.

Next, a third embodiment of the present invention will be described mainly with reference to FIG. 11. The third embodiment is distinguished from the second embodiment in which a stationary state of the image pickup apparatus is detected e.g. by detecting whether or not the tripod detection unit is fixed, in that the stationary state detection is performed by the shake detection unit 360.

The configuration of the third embodiment is basically the same as that of the first embodiment. Therefore, duplicate description of components corresponding to those in the first embodiment is omitted by denoting them using the same reference numerals, and only different points from the first embodiment will be described.

Figure 11A:
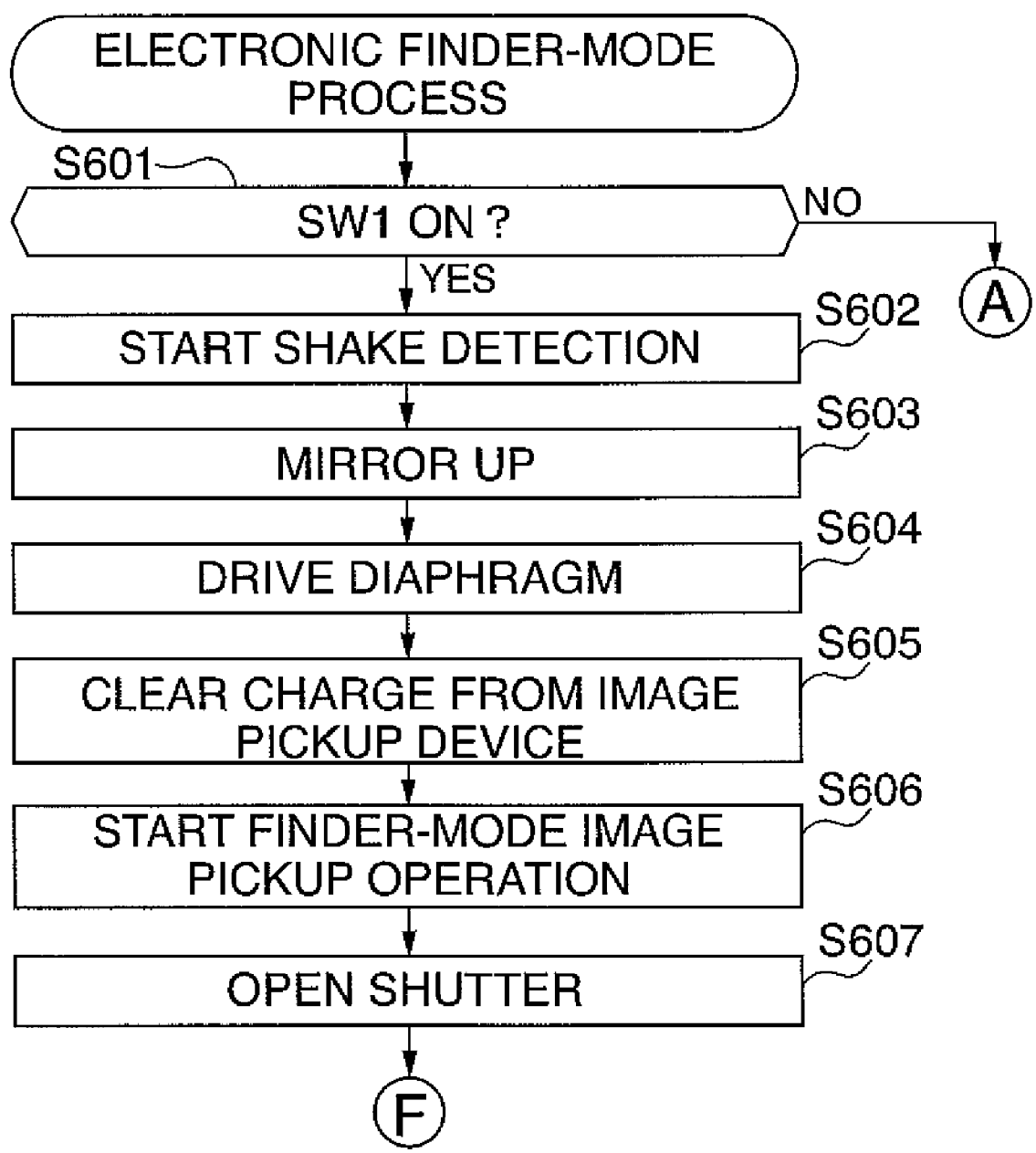
FIG. 11 is a flowchart of an electronic finder-mode process (second electronic finder-mode process) executed by an image processing unit of an image pickup apparatus according to a third embodiment of the present invention.
Figure 11B:
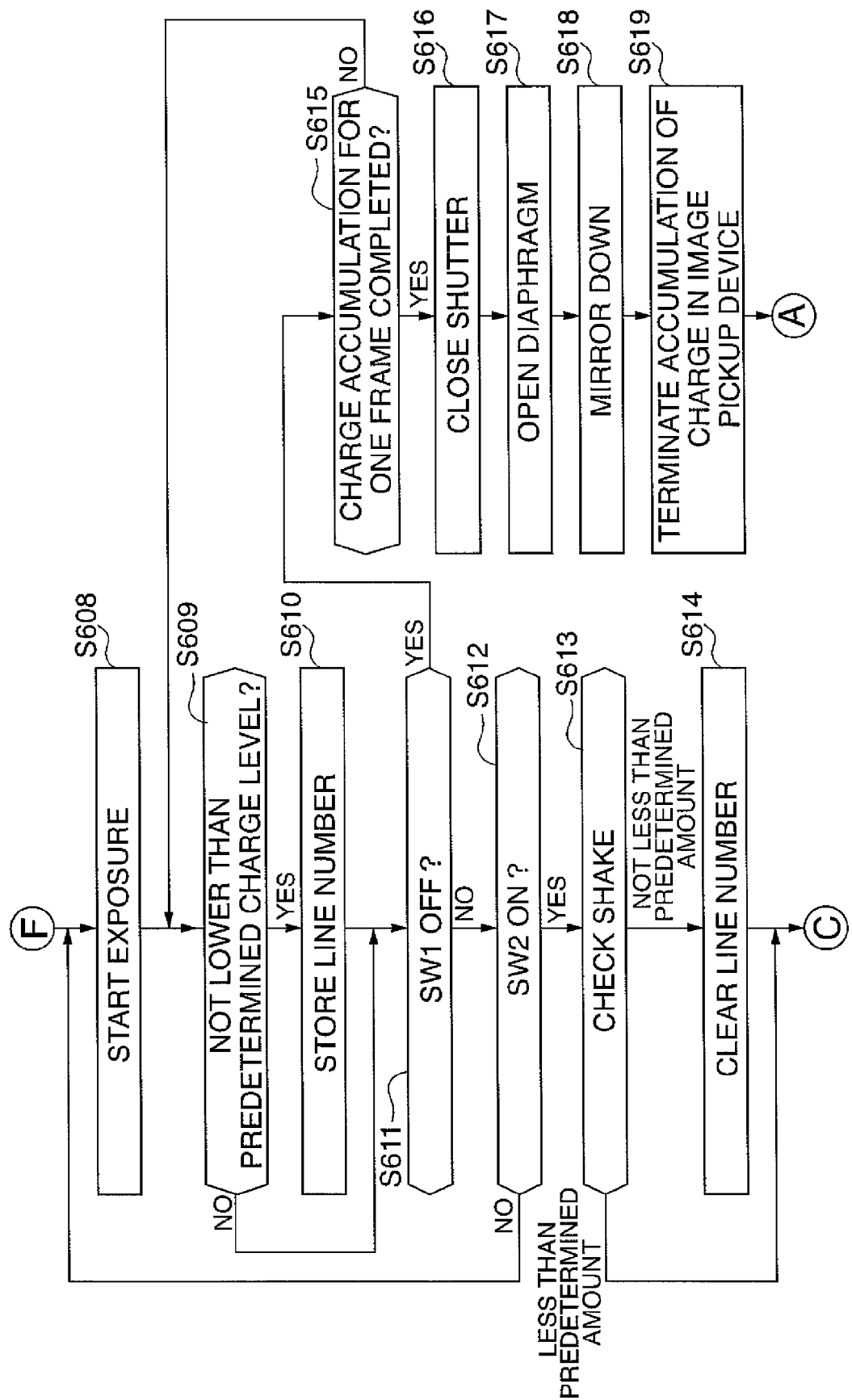

FIG. 11 is a flowchart of an electronic finder-mode process (second electronic finder-mode process) executed by an image processing unit of an image pickup apparatus according to the third embodiment.

This process starts operation when it is determined in the step S107 of the shooting operation process executed by the image processing unit 100, described hereinabove with reference to FIGS. 4 and 5, that the mode dial 60 is set to the electronic finder mode.

It should be noted that in the electronic finder mode, the exposure (line-by-line exposure) operation is performed using the rolling shutter for continuously carrying out accumulation, transfer/reading, and reset on a line-by-line basis (this operation is well-known, and hence detailed description thereof is omitted).

In a step S601, it is determined whether or not the shutter switch (SW1) 62 has been pressed. If the shutter switch (SW1) 62 has not been pressed, the process returns to the step S102 in FIG. 4, whereas if the shutter switch SW1 has been pressed, the process proceeds to a step S602.

In the step S602, the shake detection unit 360 is activated, and detection of a shake amount of the image pickup apparatus is started.

In a step S603, the system controller 50 causes the mirror driver (not shown) to move the mirror 130 to the mirror-up position.

In a step S604, the diaphragm 312 is driven to the predetermined f number by the diaphragm controller 340 according to the photometry data stored in the internal memory of the system controller 50 or in the memory 52.

In a step S605, the system controller 50 performs charge clearing of the image pickup device 14.

In steps S606 to S608, accumulation of electric charge in the image pickup device 14 is started, and the shutter controller 40 opens the shutter 12 to start exposure of the image pickup device 14.

It should be noted that monitoring of the level of output (charge leakage) to the gate 14-11 of the source follower 14-10 in the charge accumulation described with reference to FIG. 2 is started in the step S606.

The present process is executed in the rolling shutter mode, and in parallel with the charge accumulation, transfer/reading operations for the other lines are carried out in parallel. The rolling shutter mode is well-known, and hence detailed description thereof is omitted.

In steps S609 and S610, the level of output (charge leakage) to the gate 14-11 of the source follower 14-10, the monitoring of which is started in the step S606, is determined by the determination unit. Then, if the output level is not lower than a predetermined value, information on a line having the output level not lower than the predetermined value is transmitted to the memory controller 22 so as to be stored therein.

It should be noted that the information stored in the step S610 is cleared upon the start of re-accumulation of electric charge in the same line in the rolling shutter mode, and then the determining operation is performed again.

In a step S611, it is determined whether or not the shutter switch SW1 has been turned off. If the shutter switch SW1 has not been turned off, the process proceeds to a step S612, whereas if the shutter switch SW1 has been turned off, the process proceeds to a step S615.

In the step S612, it is determined whether or not the shutter switch SW2 has been turned on. If the shutter switch SW2 has not been turned on, the process returns to the step S608 to continue the exposure operation. On the other hand, if the shutter switch SW2 has been turned on, the process proceeds to a step S613.

In the step S613 and a step S614, it is checked whether the shake amount detected by the shake detection unit 360 remains less than a predetermined value after latest charge accumulation for one frame, and if the shake amount is not less than the predetermined value, the result of determination as to the level of output (charge leakage) stored in the step S610 is reset. On the other hand, if the shake amount has remains less than the predetermined value, the process proceeds to the step S118 in FIG. 5.

In the step S615, it is determined whether or not charge accumulation for one frame has been completed. If charge accumulation for one frame has not been completed, the process returns to the step S609, and the steps S609 to S615 are repeatedly carried out until the charge accumulation for one frame is completed. Then, when the charge accumulation for one frame is completed, the process proceeds to a step S616.

A line for which charge accumulation has been completed in the step S615 is placed in a reset state when the sequence of processing from the transfer/reading to the reset is completed.

In the step S616 and the following steps S617 to S618, the shutter 12 is closed, the monitoring of the level of output (charge leakage) to the gate 14-11 of the source follower 14-10 is terminated, and the diaphragm 312 is driven to the full-open f number by the diaphragm controller 340. Further, the mirror 130 is moved to the mirror-down position by the mirror driver (not shown).

Then, it is determined whether or not the set charge accumulation period has elapsed. If the set charge accumulation period has elapsed, the system controller 50 terminates the accumulation of electric charge in the image pickup device

14. Then, the process returns to the step S102 in FIG. 4, wherein the system controller 50 enters a standby state.

It should be noted that the information on the detection and the result of the determination as to the level of output (charge leakage) during the charge accumulation, which are stored during execution of the present process, are reset upon termination of the step S618.

The shooting process is the same as that described hereinbefore with reference to FIG. 10, and therefore description thereof is omitted.

It should be noted that in the second and third embodiments, if the image pickup apparatus is not stationary, the result of determination as to the level of output (charge leakage) during charge accumulation is cleared, and hence if the image pickup apparatus is not stationary, the charge transfer period is set to an initial value, i.e. a short time period. However, this is not limitative, but for example, if by executing determination of the level of output (charge leakage), a line having a pixel in which the amount of electric charge has reached the saturation level is detected, and at the same time if it cannot be determined that the image pickup apparatus is stationary, the charge transfer period may be uniformly extended for all the pixels. In this case, when no such line is detected, it is only required that the charge transfer period is held at a short time period.

Further, although in the second and third embodiments, the output level is determined using a result of detection based on the same pixel configuration as that in the first embodiment, this is not limitative.

Figure 14:
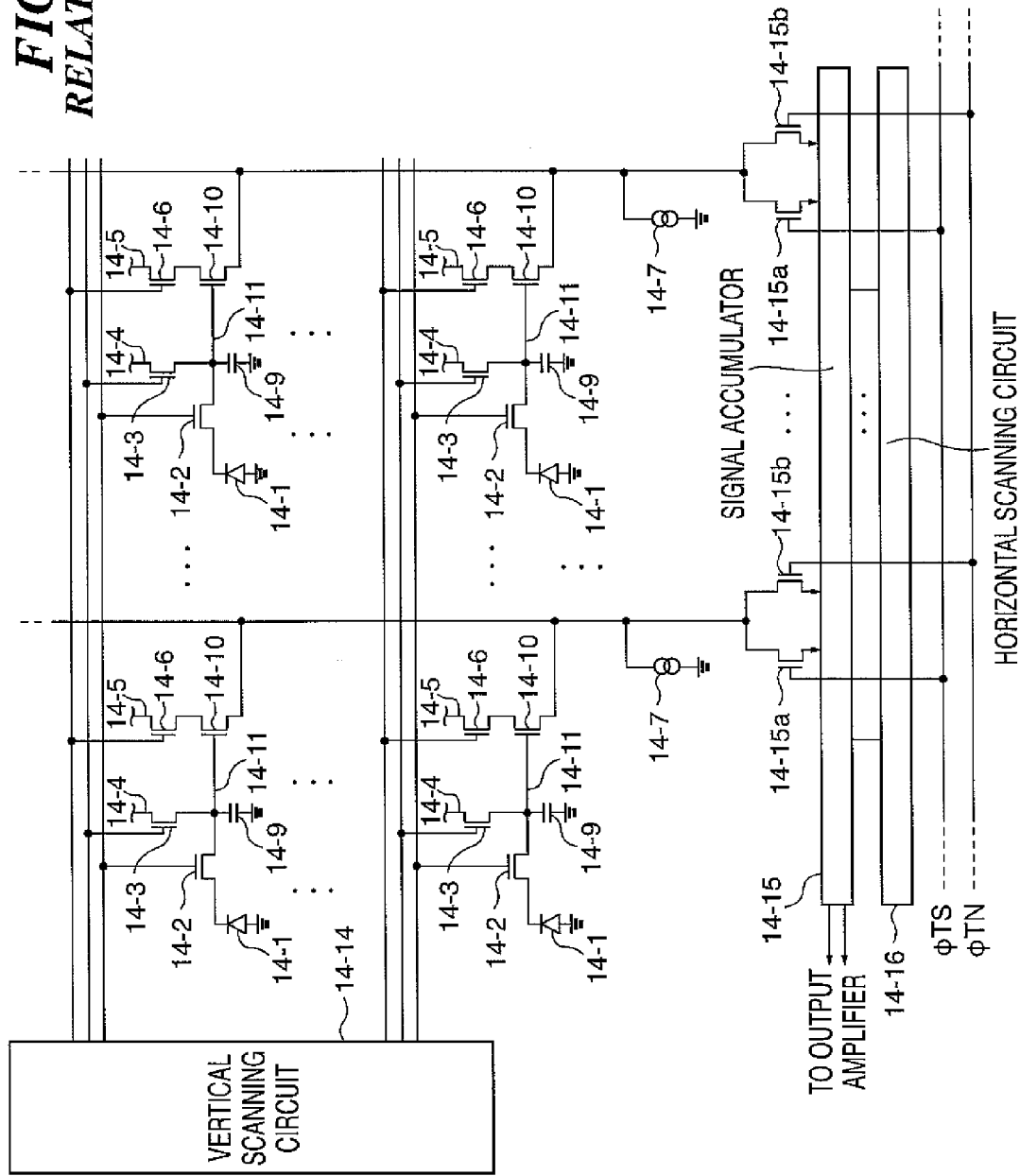
FIG. 14 is a circuit diagram of a pixel section of a conventional CMOS area sensor.
Figure 15:
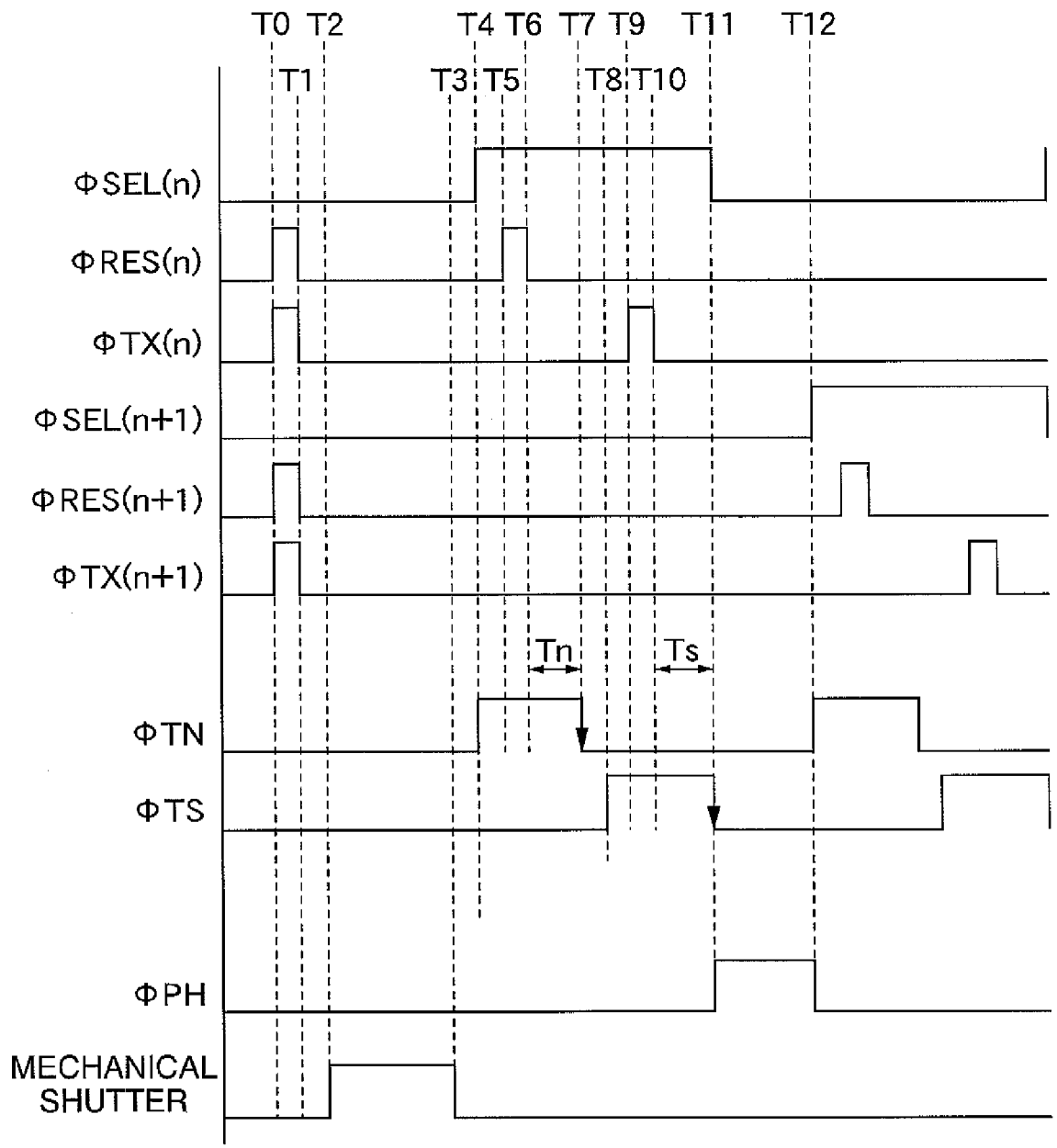
FIG. 15 is a timing diagram useful in explaining operational timing in the conventional CMOS area sensor shown in FIG. 14.

For example, in the case of subjecting a signal acquired by the conventional CMOS area sensor shown in FIG. 14 to computation in the A/D converter 16 or the image processor 20 disposed downstream, a pixel delivering a saturated output is detected as a condition for the computation, and a line having a saturated pixel is stored. Then, information on the line is used as data for changing the charge transfer period for actual shooting is also within the scope of the present invention.

Next, a fourth embodiment of the present invention will be described mainly with reference to FIG. 12. In the second embodiment, it is assumed that while it is basically considered that the presence of a pixel having reached a saturation level causes degradation of image quality, a case where it can be determined that all pixels in one line are saturated is regarded as an exception. In this case, degradation of image quality can be coped with, and therefore the charge transfer period is not required to be changed (extended), which makes it possible to prevent wasteful delay.

Figure 12:
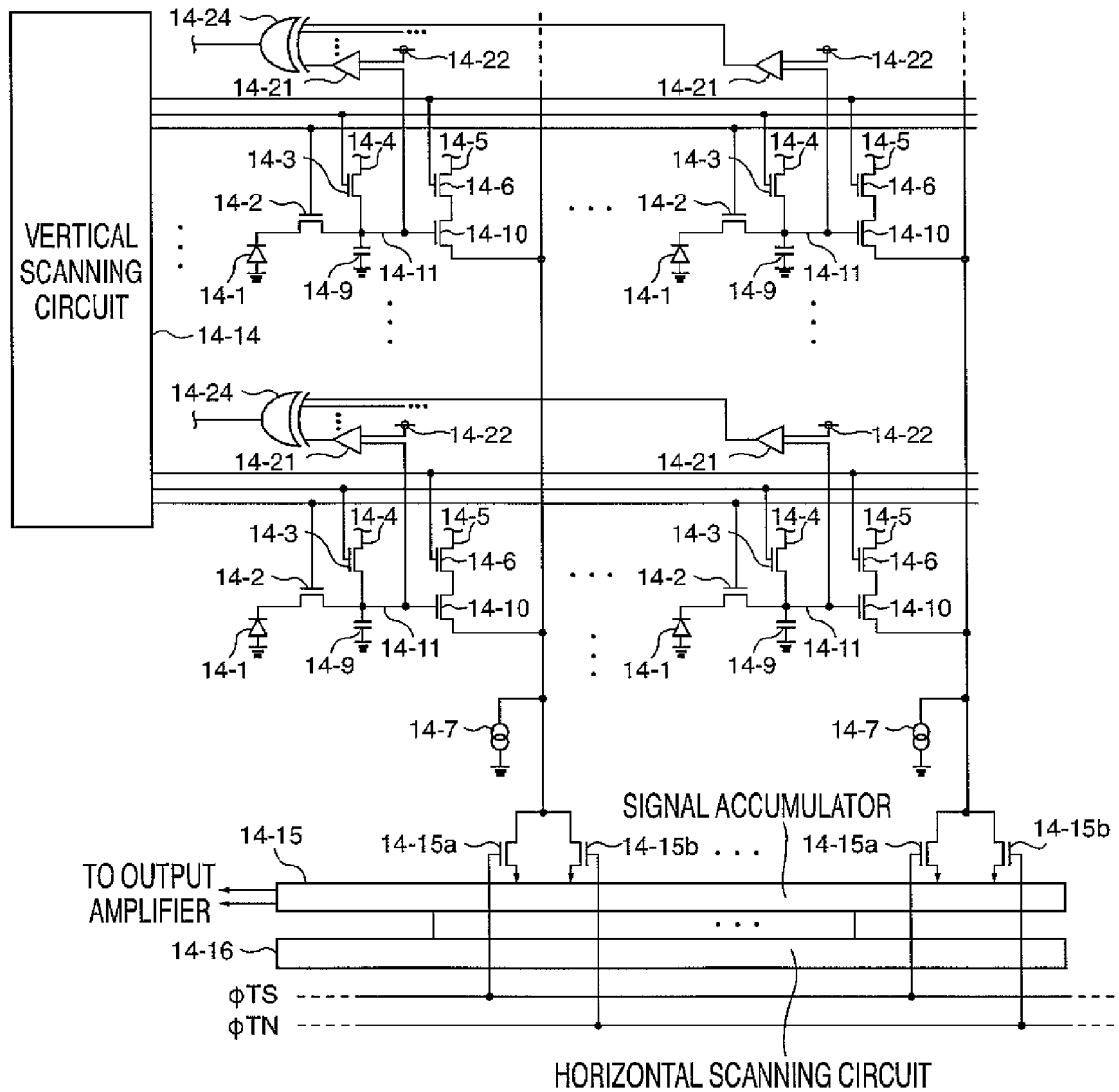
FIG. 12 is a circuit diagram of a pixel section of an image pickup device of an image pickup apparatus according to a fourth embodiment of the present invention.

FIG. 12 is a circuit diagram of a pixel section of an image pickup device of an image pickup apparatus according to the fourth embodiment. The configuration of the present embodiment is also basically the same as that of the first embodiment. Therefore, duplicate description of components corresponding to those in the first embodiment is omitted by denoting them using the same reference numerals, and only different points from the first embodiment will be described.

The present circuit diagram is basically the same as the circuit diagram described hereinbefore with reference to FIG. 2, and therefore a description will be given only of different points from the circuit diagram in FIG. 2.

A determination unit in the present embodiment is comprised of the comparator 14-21, the comparison potential 14-22, and an exclusive OR element 14-24. The determination unit determines whether or not to change the charge transfer period, based on an output from the exclusive OR element 14-24, and outputs a result of the determination.

More specifically, when charge leakage occurs in a pixel, the associated comparator 14-21 turns on, and a signal is input to the exclusive OR element 14-24. In other words, each comparator 14-21 delivers an output of 1 when a pixel associated therewith suffers from charge leakage.

When some of the pixels are saturated, the exclusive OR element 14-24 receives inputs of 1 and 0 and generates an output of 1. In other words, it is determined that the charge transfer period is required to be changed. On the other hand, when no pixel is saturated or when all the pixels are saturated, the exclusive OR element 14-24 receives all inputs of 0 or all inputs of 1 to generate an output of 0. In other words, it is determined that the charge transfer period is not required to be changed.

As for control processes other than the above points, the same control processes described as to the first to third embodiments can be applied to the present embodiment without any problem, and therefore detailed description thereof is omitted.

According to the present embodiment, if the determination unit using the comparator 14-21 determines that all pixels arranged in a line are at an output level not lower than a predetermined output level (i.e. the saturation level in the present embodiment), the charge transfer period is not changed.

Although in the present embodiment, when the determination unit determines that all pixels arranged in a line are at an output level lower than the predetermined output level or all pixels arranged in the line are at an output level not lower than the predetermined output level, the same processing is carried out, this is not limitative.

For example, processing may be carried out in which an output from an OR element and an output from an AND element are separately processed without using an exclusive-OR element, and if the output from the AND element is equal to 1, the charge transfer period is not changed, and pixel output values are fixed to thereby prevent degradation of image quality. This is also within the scope of the present invention.

Further, although in the present embodiment, determination is performed by providing the pixel section with a hardware configuration for performing determination, this is not limitative, but determination may be performed e.g. by using results of A/D conversion carried out downstream of the pixel section, for analog-to-digital conversion of pixel output signals.

In the above-described embodiments, determination by the determination unit is performed during charge accumulation. However, since the determination performed in this timing is based on leaking charge, detection is difficult unless an object is a considerably high luminance object.

Now, a fifth embodiment of the present invention will be described mainly with reference to FIG. 13. The present embodiment is distinguished from the above-described embodiments in that detection timing is changed such that detection is performed when a signal charge is transferred to the gate 14-11 of the source follower 14-10, so as to achieve more accurate detection. The configuration of the present embodiment is also basically the same as that of the first embodiment. Therefore, duplicate description of components corresponding to those in the first embodiment is omitted by denoting them using the same reference numerals, and only different points from the first embodiment will be described.

Figure 13:
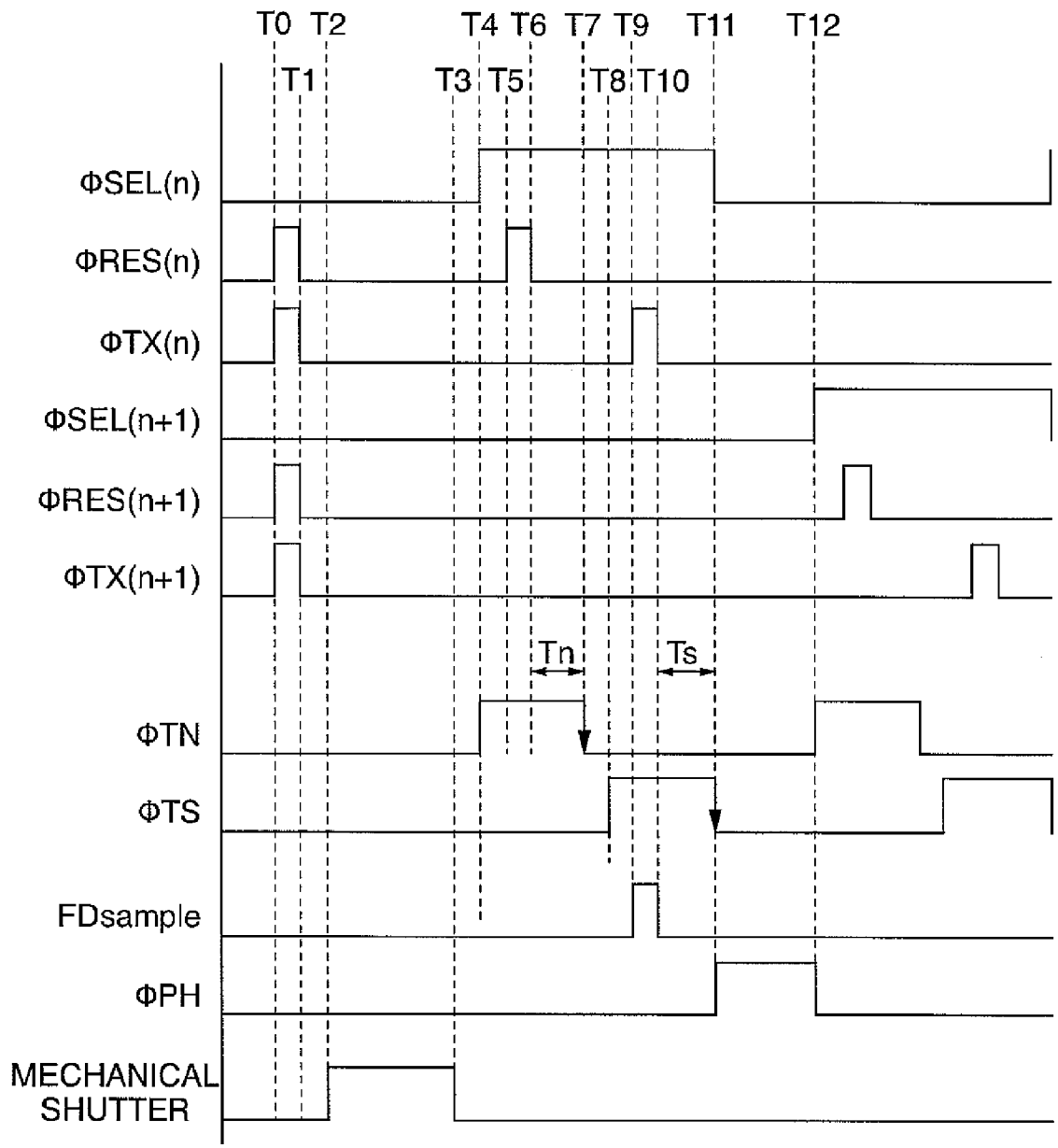
FIG. 13 is a timing diagram useful in explaining operational timing in an image pickup device of an image pickup apparatus according to a fifth embodiment of the present invention.

FIG. 13 is a timing diagram useful in explaining operational timing in an image pickup device of an image pickup apparatus according to the fifth embodiment.

The operational timing in the CMOS area sensor is controlled by signals from the timing generator 18.

The operational timing is basically the same as that in FIG. 3, and therefore a description will be given only of different points from the operational timing in FIG. 3.

In the control timing in the present embodiment, charge detection timing (indicated by FDsample) is different from that in FIG. 3.

The charge detection timing (indicated by an on-period of FDsample) corresponds to a period T9 to T10.

More specifically, detection of electric charge to the gate 14-11 of the source follower 14-10 by the determination unit is performed during the signal charge transfer period over which the control line FTX(n) is asserted and the transfer switch 14-2 is kept on. The other operational timings are the same as the corresponding ones in FIG. 3, and hence detailed description thereof is omitted.

As shown in each of the above-described embodiments, according to the present invention, the determination unit determines an output level of each pixel of the image pickup device 14 or each of the areas each formed by a plurality of pixels with reference to the predetermined output level.

Further, the determination unit detects charge leakage to the floating diffusion gate 14-11 of the image pickup device 14, which occurs during charge accumulation in an exposure operation.

Furthermore, the determination unit detects charge leakage to the floating diffusion gate 14-11 of the image pickup device 14 during the charge transfer period.

The determination unit also detects the signal level of an image captured in a pre-shooting operation carried out before actual shooting.

The system controller 50 as a control unit changes the charge transfer period in a horizontal blanking period only for lines including a pixel or an area having an output level not lower than the predetermined output level, according to the result of determination by the determination unit.

When it is determined by the determination unit that a whole line is at an output level not lower than the predetermined output level, the control unit inhibits changing the charge transfer period.

The charge transfer period includes a time period over which electric charge accumulated in an amount of a signal in the pixel section of the image pickup device 14 is transferred to the signal accumulator, awaited to be stable, and held, and the time period to be changed includes a time period over which the signal charge is awaited to be stable, within the charge transfer period.

Further, the charge transfer period includes a time period over which initializing charge for comparison in an amount of the signal is transferred to the signal accumulator of the image pickup device 14, awaited to be stable, and held, and the time period to be changed includes a time period over which the initializing charge is awaited to be stable.

Further, the predetermined output level corresponds to the saturation level. When an output at a level not lower than the predetermined output level is detected, the charge transfer period is set to be longer than when an output at a level lower than the predetermined output level is detected. Further, the area for determining the predetermined output level is an output area corresponding to one line.

The operation for changing the charge transfer period according to an output level is carried out when the shake detection unit 360 as a detection unit detects that the image pickup apparatus is stationary.

When the magnitude of a shake detected by the shake detection unit 360 is not larger than a predetermined value, the shake detection unit 360 detects that the image pickup apparatus is stationary.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2007-268008 filed Oct. 15, 2007, which is hereby incorporated by reference herein in its entirety.

What is claimed is:

1. An image pickup apparatus, which uses a CMOS area sensor as an image pickup device and records a picked-up image in a storage medium, comprising:

a determination unit adapted to determine an output level of each pixel or each area formed by a plurality of pixels in the image pickup device with reference to a predetermined output level; and a control unit adapted to change a charge transfer period in a horizontal blanking period for a line including a pixel or an area of which the output level is not lower than the predetermined output level, according to a result of determination by said determination unit, wherein the charge transfer period includes a time period over which electric charge accumulated in an amount of a signal in a pixel section of the image pickup device is transferred to a signal accumulator, awaited to be stable, and held, and a time period to be changed includes a time period over which the charge in the amount of the signal is awaited to be stable, within the charge transfer period.

2. The image pickup apparatus according to claim 1, wherein the predetermined output level is a saturation level.

3. The image pickup apparatus according to claim 1, wherein when the output level is not lower than the predetermined output level, said control unit sets the charge transfer period to be longer than when the output level is lower than the predetermined output level.

4. The image pickup apparatus according to claim 1, wherein the area for determining the output level with reference to the predetermined output level is an output area corresponding to one line.

5. The image pickup apparatus according to claim 1, wherein said determination unit detects leaking electric charge to a floating diffusion gate of the image pickup device, which occurs during charge accumulation in an exposure operation.

6. The image pickup apparatus according to claim 1, wherein said determination unit detects leaking electric charge to a floating diffusion gate of the image pickup device during the charge transfer period.

7. The image pickup apparatus according to claim 1, wherein said determination unit detects a signal level of an image captured during pre-shooting carried out before actual shooting.

8. The image pickup apparatus according to claim 7, comprising a detection unit adapted to detect a stationary state of the image pickup apparatus, and wherein when said detection unit detects the stationary state of the image pickup apparatus, said control unit carries out an operation for changing the charge transfer period according to the output level.

9. The image pickup apparatus according to claim 8, wherein said detection unit is adapted to detect a fixed state of the image pickup apparatus, and wherein when a tripod is mounted, said detection unit detects that the image pickup apparatus is stationary.

10. The image pickup apparatus according to claim 8, wherein said detection unit is a shake detection unit adapted to detect a shake, and wherein when a magnitude of a shake detected by said shake detection unit is not larger than a predetermined value, said detection unit detects that the image pickup apparatus is stationary.

11. The image pickup apparatus according to claim 1, wherein when said determination unit determines that the output level of each of all pixels of one line is not lower than the predetermined output level, said control unit inhibits changing the charge transfer period.

12. An image pickup apparatus, which uses a CMOS area sensor as an image pickup device and records a picked-up image in a storage medium, comprising:

a determination unit adapted to determine an output level of each pixel or each area formed by a plurality of pixels in the image pickup device with reference to a predetermined output level; and a control unit adapted to change a charge transfer period in a horizontal blanking period for a line including a pixel or an area of which the output level is not lower than the predetermined output level, according to a result of determination by said determination unit, wherein the charge transfer period includes a time period over which initializing charge for comparison in an amount of a signal is transferred to a signal accumulator of the image pickup device, awaited to be stable, and held, and a time period to be changed includes a time period over which the initializing charge for comparison in the amount of the signal is awaited to be stable, within the charge transfer period.

13. The image pickup apparatus according to claim 12, wherein the predetermined output level is a saturation level.

14. The image pickup apparatus according to claim 12, wherein when the output level is not lower than the predetermined output level, said control unit sets the charge transfer period to be longer than when the output level is lower than the predetermined output level.

15. The image pickup apparatus according to claim 12, wherein the area for determining the output level with reference to the predetermined output level is an output area corresponding to one line.

16. The image pickup apparatus according to claim 12, wherein said determination unit detects leaking electric charge to a floating diffusion gate of the image pickup device, which occurs during charge accumulation in an exposure operation.

17. The image pickup apparatus according to claim 12, wherein said determination unit detects leaking electric charge to a floating diffusion gate of the image pickup device during the charge transfer period.

18. The image pickup apparatus according to claim 12, wherein said determination unit detects a signal level of an image captured during pre-shooting carried out before actual shooting.

19. The image pickup apparatus according to claim 18, comprising a detection unit adapted to detect a stationary state of the image pickup apparatus, and wherein when said detection unit detects the stationary state of the image pickup apparatus, said control unit carries out an operation for changing the charge transfer period according to the output level.

20. The image pickup apparatus according to claim 19, wherein said detection unit is adapted to detect a fixed state of the image pickup apparatus, and wherein when a tripod is mounted, said detection unit detects that the image pickup apparatus is stationary.

21. The image pickup apparatus according to claim 19, wherein said detection unit is a shake detection unit adapted to detect a shake, and wherein when a magnitude of a shake detected by said shake detection unit is not larger than a predetermined value, said detection unit detects that the image pickup apparatus is stationary.

22. The image pickup apparatus according to claim 12, wherein when said determination unit determines that the output level of each of all pixels of one line is not lower than the predetermined output level, said control unit inhibits changing the charge transfer period.

* * * * *